US012768198B2

(12) United States Patent
Graham

(10) Patent No.: US 12,768,198 B2
(45) Date of Patent: *Oct. 20, 2026

(54) DEADBOLT ASSEMBLY

(71) Applicant: Schlage Lock Company LLC, Carmel, IN (US)

(72) Inventor: Matthew S. Graham, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 40 days.

This patent is subject to a terminal disclaimer.

(21) Appl. No.: 18/762,427

(22) Filed: Jul. 2, 2024

(65) Prior Publication Data

US 2026/0117557 A1 Apr. 30, 2026

Related U.S. Application Data

(63) Continuation of application No. 18/106,819, filed on Feb. 7, 2023, now Pat. No. 12,024,920, which is a continuation of application No. 17/064,233, filed on Oct. 6, 2020, now Pat. No. 11,572,707, which is a continuation of application No. 16/141,373, filed on Sep. 25, 2018, now Pat. No. 10,794,086, which is a continuation of application No. 14/324,052, filed on Jul. 3, 2014, now Pat. No. 10,081,967.

(51) Int. Cl.
*E05B 17/20* (2006.01)

(52) U.S. Cl.
CPC ...... *E05B 17/2084* (2013.01); *E05B 17/2057* (2013.01)

(58) Field of Classification Search
CPC ......................... E05B 17/2057; E05B 17/2084
See application file for complete search history.

(56) References Cited

U.S. PATENT DOCUMENTS

| | | | |
|---|---|---|---|
| 1,418,822 | A | 6/1922 | Miller |
| 2,129,412 | A | 9/1938 | Edele |
| 2,327,071 | A | 8/1943 | Schlage |
| 2,762,642 | A | 9/1956 | Jewett |
| 2,781,218 | A | 2/1957 | Jewett |
| 2,789,527 | A | 4/1957 | Davis |
| 3,123,387 | A | 3/1964 | Jackson et al. |

(Continued)

OTHER PUBLICATIONS

Canadian Office Action; Canadian Intellectual Property Office; Canadian Patent Application No. 2,956,393; Dec. 8, 2017; 3 pages.

(Continued)

*Primary Examiner* — Mark A Williams
(74) *Attorney, Agent, or Firm* — Taft Stettinius & Hollister LLP

(57) ABSTRACT

An example system includes a deadbolt assembly including a housing, a traveler positioned in the housing, and a bolt including a ramp arm engaged with the traveler. The housing may include a first deadlocking component, and the traveler may include a second deadlocking component. The bolt is movable between a distal extended position and a proximal retracted position. When the bolt is pushed in the distal direction by an external force, the ramp arm urges the traveler in a lateral direction, and the first and second deadlocking components engage, deadlocking the bolt.

18 Claims, 13 Drawing Sheets

(56) References Cited

U.S. PATENT DOCUMENTS

| | | | | |
|---|---|---|---|---|
| 3,600,022 | A | 8/1971 | Armstrong | |
| 3,696,648 | A | 10/1972 | Horgan, Jr. | |
| 3,776,582 | A | 12/1973 | Balducci | |
| 3,788,687 | A | 1/1974 | Zawadzki | |
| 3,844,592 | A | 10/1974 | Giardina et al. | |
| 3,989,286 | A * | 11/1976 | Cleff | E05C 17/446 292/201 |
| 4,263,795 | A | 4/1981 | Van Gompel | |
| 4,506,922 | A | 3/1985 | Horgan, Jr. | |
| 4,593,542 | A | 6/1986 | Rotondi et al. | |
| 5,531,492 | A | 7/1996 | Raskevicius | |
| 5,904,384 | A | 5/1999 | Mader et al. | |
| 6,684,669 | B1 | 2/2004 | Talpe | |
| 7,712,799 | B2 | 5/2010 | Peng | |
| 7,849,718 | B2 | 12/2010 | Ambrass | |
| 7,887,107 | B2 | 2/2011 | Shen | |
| 8,146,962 | B2 | 4/2012 | Lu et al. | |
| 8,702,132 | B2 | 4/2014 | Tien | |
| 9,151,093 | B2 | 10/2015 | Lin | |
| 10,081,967 | B2 | 9/2018 | Graham | |
| 10,435,927 | B2 | 10/2019 | Arlinghaus et al. | |
| 10,794,086 | B2 | 10/2020 | Graham | |
| 2009/0194999 | A1 | 8/2009 | Shen | |
| 2010/0066101 | A1 | 3/2010 | Shen | |
| 2010/0117376 | A1 | 5/2010 | Shen | |
| 2013/0154283 | A1 | 6/2013 | Arlinghaus et al. | |

OTHER PUBLICATIONS

International Search Report; International Searching Authority; US Patent and Trademark Office; International Application No. PCT/US2015/039203; Sep. 23, 2015; 2 pages.

Written Opinion of the International Searching Authority; US Patent and Trademark Office; International Application No. PCT/US2015/039203; Sep. 23, 2015; 6 pages.

* cited by examiner

DEADBOLT ASSEMBLY

CROSS REFERENCE TO RELATED APPLICATIONS

This application is a continuation of U.S. patent application Ser. No. 18/106,819 filed Feb. 7, 2023 and issued as U.S. Pat. No. 12,024,920, which is a continuation of U.S. patent application Ser. No. 17/064,233 filed Oct. 6, 2020 and issued as U.S. Pat. No. 11,572,707, which is a continuation of U.S. patent application Ser. No. 16/141,373 filed Sep. 25, 2018 and issued as U.S. Pat. No. 10,794,086, which is a continuation of U.S. patent application Ser. No. 14/324,052 filed Jul. 3, 2014 and issued as U.S. Pat. No. 10,081,967, the contents of each application are incorporated herein by reference in their entirety.

TECHNICAL FIELD

The present invention generally relates to deadbolt assemblies, and more particularly, but not exclusively, to deadbolt assemblies with multiple deadlocking positions.

BACKGROUND

Deadbolt assemblies are commonly used to lock doors. Some such assemblies have certain limitations, such as those relating to providing an adjustable projection distance while retaining effective deadlocking functionality. Therefore, a need remains for further improvements in systems and methods for adjustable deadbolts.

SUMMARY

An example system includes a deadbolt assembly including a housing, a traveler positioned in the housing, and a bolt including a ramp arm engaged with the traveler. The housing may include a first deadlocking component, and the traveler may include a second deadlocking component. The bolt is movable between a distal extended position and a proximal retracted position. When the bolt is pushed in the distal direction by an external force, the ramp arm urges the traveler in a lateral direction, and the first and second deadlocking components engage, deadlocking the bolt. Further embodiments, forms, features, and aspects of the present application shall become apparent from the description and figures provided herewith.

DETAILED DESCRIPTION OF ILLUSTRATIVE EMBODIMENTS

Figure 1:
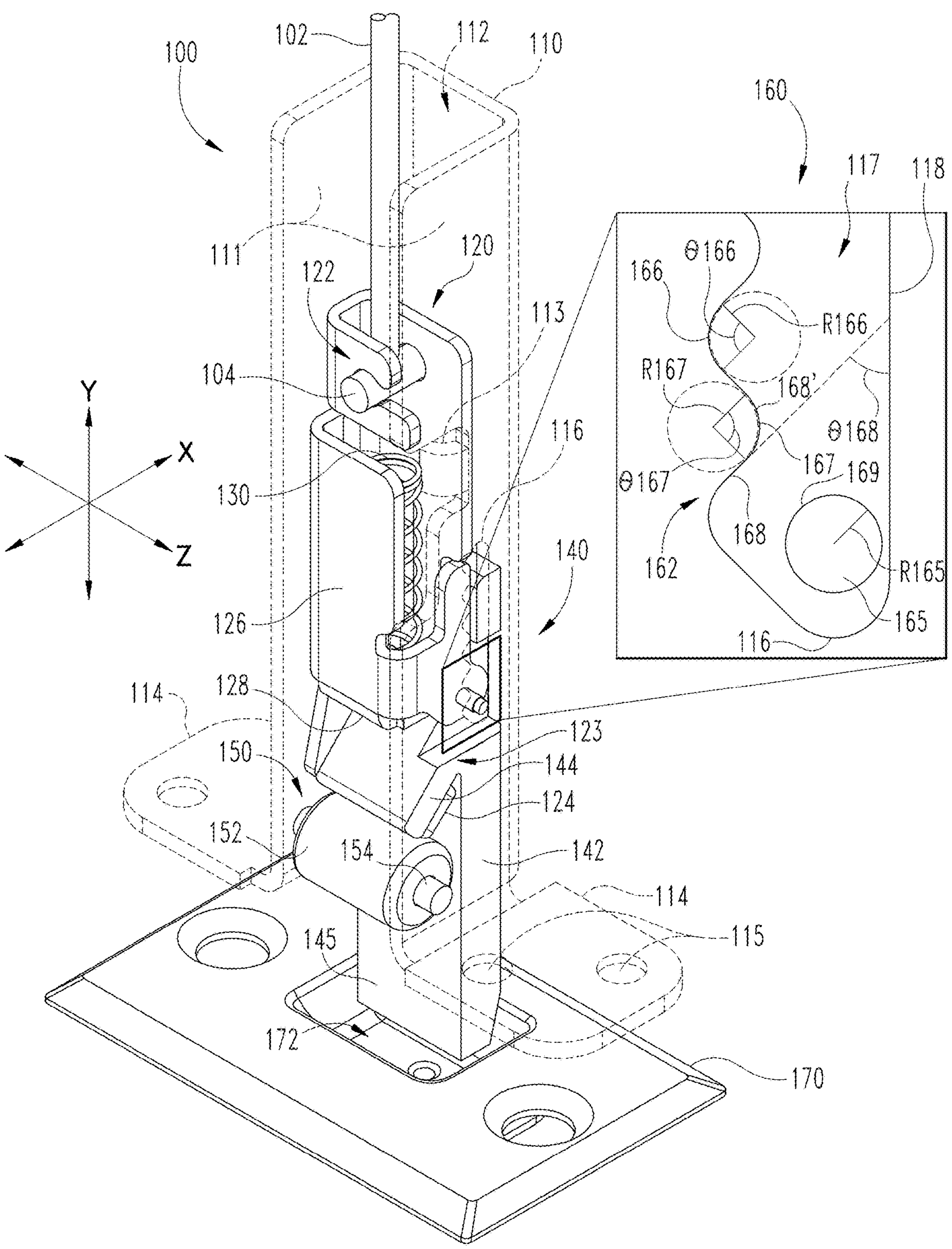
FIG. 1 is an isometric illustration of a deadbolt assembly according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a deadbolt assembly 100 according to one embodiment includes a housing 110, a traveler 120 movably mounted in the housing 110, and may further include a biasing element such as a spring 130 carried by the traveler 120. The exemplary assembly 100 further includes a sliding bolt 140, a lateral support mechanism 150 providing lateral support for the bolt 140, and a deadlocking mechanism 160 operable to prevent the bolt 140 from being moved into the housing 110 by application of an external force. The deadbolt assembly 100 may be utilized in association with a strike 170 operable to receive a portion of the bolt 140. The deadbolt assembly 100 may further include a second spring urging the bolt 140 in an extending direction, for example as described below with reference to FIGS. 8-10.

The deadbolt assembly 100 may be configured to engage a connector 102 coupled to an actuator such as a pushbar or lever. In certain forms, the connector 102 may be a rigid connector, such as a rod. In other forms, the connector 102 may be a flexible connector, such as a cable. As described in further detail below, the actuator may be operable to retract the connector 102, which in turn pulls the bolt 140 (i.e., via the traveler 120) in a longitudinal direction, thereby retracting the bolt 140.

As used herein, the terms “longitudinal”, “lateral”, and “transverse” are used to denote motion or spacing along or substantially along three mutually perpendicular axes. In the illustrated form coordinate plane, the X-axis defines the lateral directions, the Y-axis defines the longitudinal directions (including a proximal direction and a distal direction), and the Z-axis defines the transverse directions. These terms are used for case of convenience and description, and are without regard to the orientation of the assembly 100 with respect to the environment. In the embodiments illustrated in the figures, the longitudinal direction is vertical such that the proximal and distal directions are upward and downward directions, respectively, and the lateral and transverse directions are horizontal directions. It is to be understood, however, that other orientations are also contemplated. For example, descriptions that reference a longitudinal direction may be equally applicable to a vertical direction, a horizontal direction, or an off-axis orientation with respect to the environment. The terms are therefore not to be construed as limiting the scope of the subject matter described herein.

Figure 2:
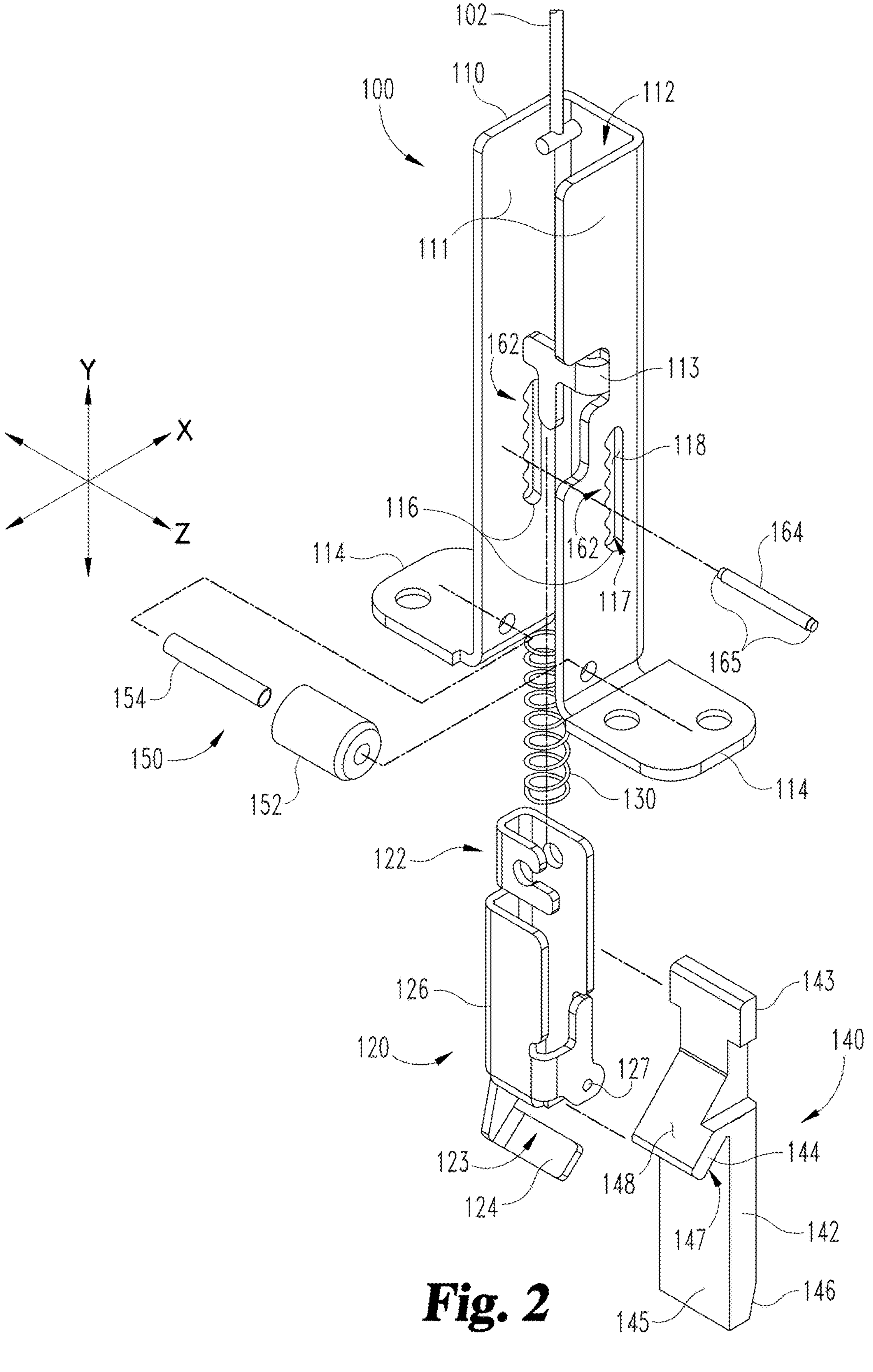
FIG. 2 is an exploded isometric view of the deadbolt assembly.

With additional reference to FIG. 2, the exemplary housing 110 includes pair of transversely spaced sidewalls 111 defining a longitudinal channel 112 therebetween. The channel 112 is sized and configured to receive various elements of the deadbolt assembly 100 within the housing 110, such that the assembly 100 may be mounted in or on a door. The housing 110 may further include flanges 114 with mounting holes 115 through which fasteners such as screws may be passed, such that the housing 110 can be mounted to a door.

Each of the sidewalls 111 defines a slot 116 including a longitudinal portion 117, which may be defined in part by a straight edge 118 of the slot 116. The slots 116 are transversely spaced from one another and extend primarily in the longitudinal direction on opposing sides of the channel 112. That is to say, the slots 116 are spaced apart from one another along the illustrated Z-axis, and extend primarily in the direction of the illustrated Y-axis. In embodiments which utilize the illustrated spring 130, the housing 110 may further include an arm 113 operable to retain the spring 130 within the traveler 120.

The traveler 120 is positioned at least partially within the housing channel 112, and a proximal end of the traveler 120 includes a coupling feature 122 by which the traveler 120 can be coupled to the connector 102. For example, the coupling feature 122 may comprise openings configured to receive a post 104 of the connector 102. It is also contemplated that the coupling feature 122 may be operable to couple the traveler 120 to the connector 102 in another manner, such as through a threaded engagement, a snap-fit connection, or another form of coupling.

A distal end of the traveler 120 includes an arm or wall 124 operable to retract the bolt 140 when the connector 102 pulls the traveler 120 in a proximal or retracting direction (upward in FIGS. 1 and 2). As described in further detail below, the wall 124 may be angularly offset from the longitudinal axis, for example to form an oblique angle with respect to the longitudinal and lateral axes of the assembly 100. The traveler 120 may further comprise a bracket 126 including one or more transversely spaced openings 127 operable to receive a pin 164 of the deadlocking mechanism 160. When the pin 164 is attached to the traveler 120 (e.g., through the openings 127), the pin 164 extends in the transverse direction. A gap 123 and is thus defined between transversely extending elements in the form of the wall 124 and the pin 164. It is also contemplated the gap 123 may be defined by transverse elements of another form, such as a transversely-extending pin, tab, flange, or rod.

In embodiments which utilize the spring 130, the spring 130 is configured to urge the traveler 120 in a distal or extending direction (downward in FIGS. 1 and 2). In the illustrated embodiment, the spring 130 is housed in the traveler 120 between the housing arm 113 and a flange 128 formed by the bracket 126. Thus, when the traveler 120 is retracted with respect to the housing 110, the spring 130 is compressed between the arm 113 and the flange 128, biasing the traveler 120 in the direction of extension. In the illustrated form, the traveler 120 is biased in the extending direction by a helical compression spring 130. It is also contemplated that the traveler 120 may be biased in the extending direction by another form of biasing member, such as an extension spring or another form of elastic element. In further embodiments, the spring 130 may be omitted. In such forms, the traveler 120 may be biased in the distal direction by another biasing force, such as gravity. For example, in embodiments in which the distal direction is a downward direction, the traveler 120 may be biased downward by the weight of the connector (for example in embodiments in which the connector is a rod), or by the weight of the traveler 120 itself.

The bolt 140 is positioned at least partially in the channel 112 and is slidably mounted in the housing 110 such that the bolt 140 is operable to slide in the proximal and distal directions to retract and extend, respectively. The bolt 140 includes a longitudinal body portion 142, a ramp arm 144 extending from the body portion 142, and a distal end portion 145, which may include a tapered surface 146. The body portion 142 may further include a proximal end portion 143 extending proximally beyond the ramp arm 144. The ramp arm 144 extends laterally and distally from the body portion 142 and into the gap 123, thereby engaging the traveler 120.

The illustrated ramp arm 144 includes a distal ramp surface 147 and a proximal ramp surface 148. When the ramp arm 144 is received in the gap 123, the distal ramp surface 147 is adjacent the transverse element defining one side of the gap 123 (here, the wall 124), and the proximal ramp surface 148 is adjacent the transverse element defining the opposing side of the gap 123 (here, the pin 164). As described in further detail below, the engagement between the ramp arm 144 and the traveler 120 is such that each of the traveler 120 and the bolt 140 moves in response to motion of the other of the traveler 120 and the bolt 140. The gap 123 may be sized and configured to closely receive the ramp arm 144, such that there is substantially no lost motion between the traveler 120 and the bolt 140 in the longitudinal direction.

The lateral support mechanism 150 is configured to provide lateral support for the bolt 140, and may include friction-reducing features such that the support mechanism 150 does not substantially impair longitudinal motion of the bolt 140 during extension and retraction. In the illustrated form, the lateral support mechanism 150 comprises a roller 152 rotatably mounted to the housing 110 by a transverse roller pin 154. It is also contemplated that the lateral support mechanism 150 may utilize other elements to provide the lateral support and/or friction reducing features. For example, the support mechanism 150 may include ball bearings, posts, or other features which slidingly or rotatably engage the bolt 140.

The deadlocking mechanism 160 is configured to prevent the bolt 140 from being forced to the retracted position by an external force, and includes first and second deadlocking components in the form of a deadlocking surface 162 and a deadlocking member comprising a pin 164. While other forms are contemplated, in the illustrated embodiment, the deadlocking surface 162 is defined by an edge of one of the housing slots 116, and the pin 164 is coupled to the traveler 120. The end of the pin 164 extends transversely from the side of the traveler 120 into the slot 116, defining a deadlocking protrusion 165. The deadlocking mechanism 160 further includes a second deadlocking surface 162 defined by an edge of the second slot 116, and the second end of the pin 164 extends transversely into the second slot 116, defining a second deadlocking protrusion 165. That is to say, opposing ends of the pin 164 define deadlocking protrusions 165 which extend transversely from opposing sides of the traveler 120. As described in further detail below, the illustrated deadlocking mechanism 160 is operable in a plurality of deadlocking states. In each of the deadlocking states, each of the deadlocking protrusions 165 is received in a notch 166, such that a first contact surface 168 of the deadlocking surface 162 is engaged with a second contact surface 169 of the deadlocking protrusion.

While the illustrated deadlocking mechanism 160 includes a pair of transversely spaced deadlocking surfaces 162 and a pair of deadlocking protrusions 165, certain descriptions hereinafter may refer to only one member of the pair. For example, in the interests of case, convenience, and clarity of description, a description of the deadbolt assembly 100 may include a characterization that in each deadlocking position, the deadlocking protrusion 165 is received in one of the notches 166. It is to be understood, however, that such a description may be utilized to indicate that each of the deadlocking protrusions 165 is received in one of the notches 166, for example in embodiments which include plural deadlocking protrusions 165 and deadlocking surfaces 162. Additionally, while the illustrated embodiment includes a single pin 164, it is also contemplated that additional pins 164 or other elements may be utilized to form additional longitudinally spaced deadlocking protrusions 165 on opposing sides of the traveler 120.

As best seen in the enlarged region of FIG. 1, each deadlocking surface 162 is a wave-like surface comprising a series of alternating notches 166 and projections 167, with the first contact surfaces 168 connecting the notches 166 to adjacent projections 167. In various forms, a first contact surface 168 may be considered to be a portion of one of the notches 166 and/or one of the projections 167. The notches 166 extend laterally away from the straight edge 118, and the projections 167 extend laterally toward the straight edge 118.

While other forms are contemplated, in the illustrated embodiment, the notches 166 and protrusions 167 are defined by segments of a circular arc, and the first contact surfaces 168 are substantially straight surfaces connecting the arc segments. The arc segments defining the notches 166 and/or the protrusions 167 may have a radius of curvature corresponding to a radius of the deadlocking protrusion 165. For example, if the deadlocking protrusion 165 comprises a radius R165, the notches 166 comprise a curvature radius R166, and the projections 167 comprise a curvature radius R167, one or both of the curvature radii R166, R167 may be equal or substantially equal to the projection radius R165. The arc segments defining the notches 166 and the projections 167 each comprise a central angle θ166, θ167. The first contact surfaces 168 may be angularly offset from the longitudinal axis Y by an oblique angle θ168. While other forms are contemplated, in the illustrated embodiment, the first contact surface offset angle θ168 is about 45°, and each of the central angles θ166, θ167 is about 90°, such that the first contact surface 168 is substantially perpendicular to a third contact surface 168' on the distal side of the notch 166.

It is also contemplated that one or both of the deadlocking surfaces 162 may take another form. In certain embodiments, the notches 166 and/or the projections 167 may not necessarily comprise circular arcuate segments. For example, a notch 166 and/or a projection 167 may be defined at least in part by a non-circular arcuate segment or another curvilinear and/or rectilinear edge. Additionally or alternatively, the first contact surfaces 168 may comprise curvilinear portions. In certain embodiments, the deadlocking surfaces 162 may be defined by a sinusoidal waveform, scallops, or a sawtooth pattern. In further embodiments, the deadlocking surfaces 162 may not necessarily include the notches 166 and/or the projections 167, and the first contact surfaces 168 may be formed by transverse extensions, such as described below with reference to FIG. 16.

Each of the notches 166 is sized and configured to receive one of the deadlocking protrusions 165, each of which includes a second contact surface 169. In the illustrated form, the second contact surface 169 is an arcuate segment having a curvature radius corresponding to the deadlocking protrusion radius R165. It is also contemplated that the second contact surface 169 may comprise rectilinear portions. As described in further detail below, the traveler 120 is operable in a first lateral position and a second lateral position. With the traveler 120 in the first lateral position, the deadlocking protrusion 165 is not received in a notch 166, and the first and second contact surfaces 168, 169 are not in contact. With the traveler 120 in the second lateral position, the deadlocking protrusion 165 is received in a notch 166, and one of the first contact surfaces 168 is adjacent the second contact surface 169.

As described in further detail below, engagement of the deadlocking protrusion 165 with the deadlocking surface 162 deadlocks the bolt 140 in a position corresponding to the notch 166 in which the deadlocking protrusion 165 is received. Thus, each of the notches 166 defines a different deadlocking position for the bolt 140. In the illustrated form, the deadlocking protrusions 165 comprise a substantially circular cross-section, and the notches 166 comprise a circular arc segment having a radius of curvature R166 corresponding to a radius R165 of the deadlocking protrusions 165. It is also contemplated that the deadlocking protrusions 165 may comprise a non-circular cross-section, and the notches 166 may have a shape corresponding to that of the deadlocking protrusions 165.

In the illustrated form, the deadbolt assembly 100 is associated with a strike 170, which may be installed in a doorframe or in a floor. The strike 170 may include a pocket 172 operable to receive the distal end portion 145 when the bolt 140 is in the extended position, thereby preventing lateral motion of the deadbolt assembly 100 with respect to the strike 170. As will be appreciated by those having skill in the art, when the deadbolt assembly 100 is mounted to a door and the strike 170 is mounted to the doorframe or the floor, engagement between the bolt 140 and the strike 170 will prevent the door from being opened when the bolt 140 is in the extended position. In certain embodiments, the strike 170 may be omitted, and the distal end portion 145 may extend into an opening formed in the doorframe or the floor when the bolt 140 is in an extended position.

With additional reference to FIGS. 3-6, the illustrative deadbolt assembly 100 may be utilized in a remote latching system 101 including the connector 102, an actuator 106, and a door 190 on or in which the deadbolt assembly 100 and the actuator 106 are mounted. In certain forms, the remote latching system 101 may be a multipoint latching system including additional latches or bolts. For example, the system 101 may be of the type described in the commonly-owned U.S. patent application Ser. No. 14/324,016 to Ali et al., the contents of which are incorporated by reference.

Figure 3:
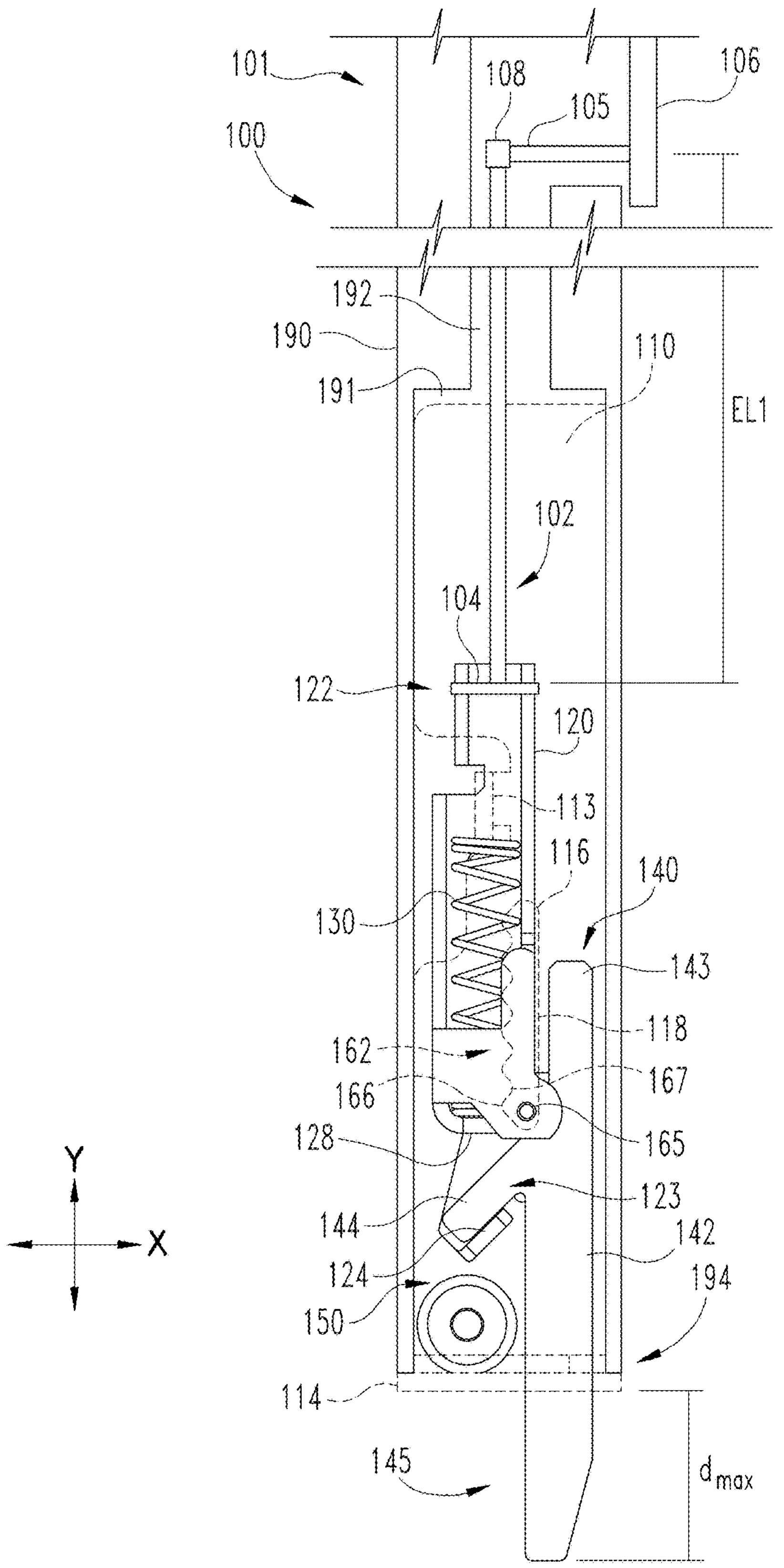
FIG. 3 depicts a system including the deadbolt assembly in a first extended state.

With specific reference to FIG. 3, the illustrated door 190 includes a cavity 191 operable to receive the deadbolt assembly 100, and a channel 192 operable to receive the connector 102, such that the remote latching system 101 is a concealed remote latching system. In other embodiments, the deadbolt assembly 100 may be mounted on a surface of the door 190, for example as an element of a surface-mounted remote latching system. In such forms, the connector 102 may not necessarily extend through a channel in the door 190.

Figure 4:
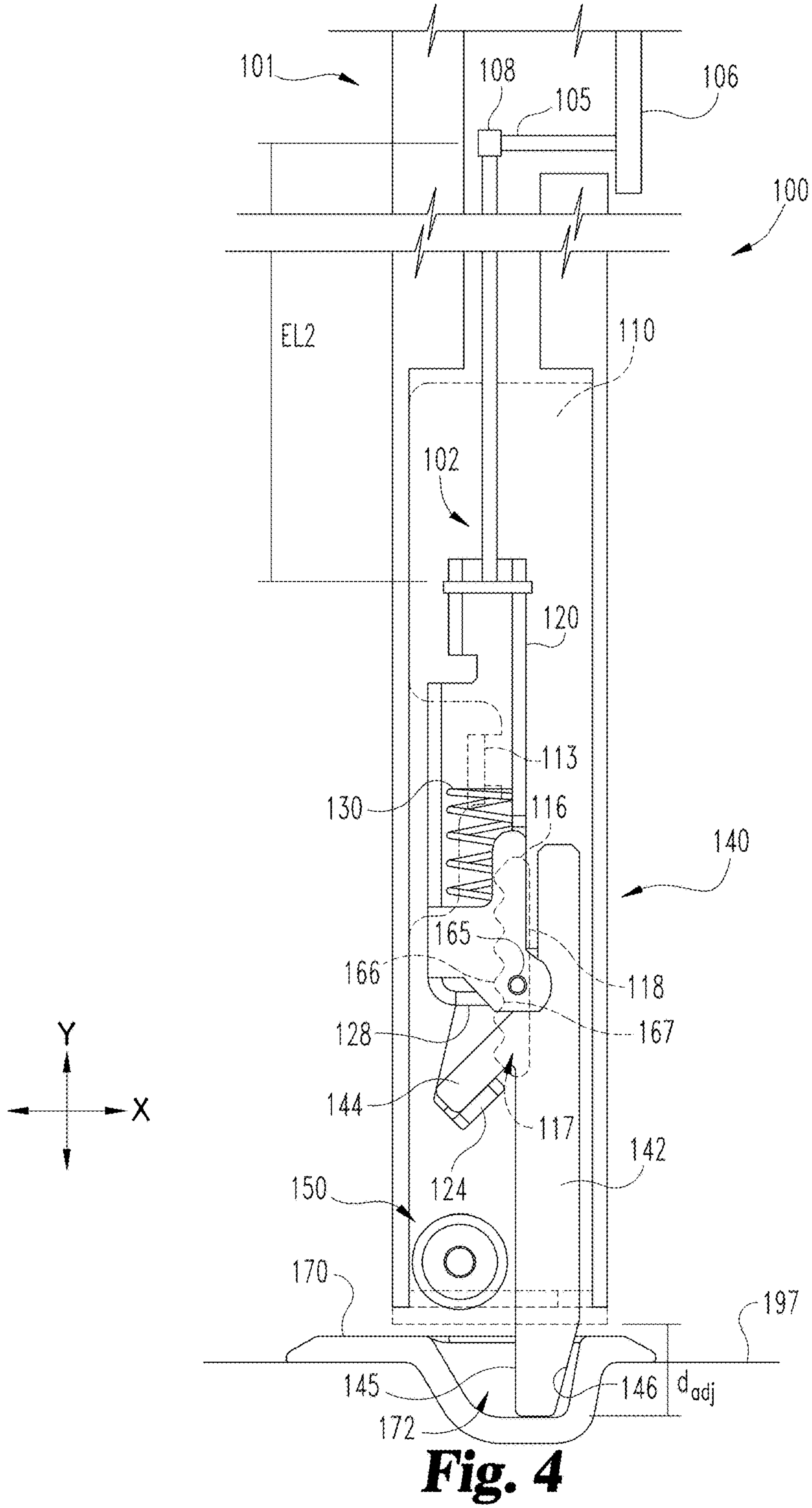
FIG. 4 depicts the system with the deadbolt assembly in a second extended state.

In the illustrated embodiment, the cavity 191 is adjacent a bottom edge 194 of the door 190, such that the deadbolt assembly 100 is configured as a bottom bolt assembly. In such forms, the strike 170 may be installed in or on the floor 197 (FIG. 4). In other embodiments, the deadbolt assembly

100 may be installed proximate the top edge or the swinging edge (i.e., the edge opposite the hinged edge) of the door 190, and the strike 170 may be mounted on or in a doorframe. In further embodiments, the strike 170 may be omitted, and the bolt 140 may directly engage the floor 197 or the doorframe.

When assembled as illustrated in FIGS. 3-6, opposing ends of the connector 102 are coupled to the traveler 120 and a retractor 105 of the actuator 106. The actuator 106 is operable to longitudinally retract the connector 102 by moving the retractor 105, and may, for example, comprise a pushbar, mortise assembly, exit device, or another form of manually and/or electrically operable actuator mounted on or in the door 190. The connector 102 may be biased to an extended position (for example by the spring 130 or by gravity), and may move to a retracted position when retracted by the actuator 106.

The remote latching system 101 may further include an adjustment mechanism 108 operable to adjust the effective length of the connector 102. That is to say that by operating the adjustment mechanism 108, a user can adjust the distance between the retractor 105 and the proximal end of the traveler 120, for example to adjust the projection distance or to accommodate different longitudinal dimensions of the door 190. In certain embodiments, the adjustment mechanism 108 may comprise a threaded coupling between the connector 102 and the actuator 106, such that rotating a portion of the adjustment mechanism 108 or a portion of the connector 102 adjusts the effective length. In other embodiments, the adjustment mechanism 108 may be of another form known in the art. In embodiments in which the connector 102 is a flexible member such as a cable, the adjustment mechanism 108 may comprise a spool, and adjusting the effective length of the connector 102 may include winding a portion of the cable about the spool, for example as disclosed in the above-referenced and commonly-owned U.S. patent application Ser. No. 14/324,016 to Ali et al. In the illustrated embodiment, the adjustment mechanism 108 is remote from the deadbolt assembly 100, and is not positioned in the cavity 191. In other forms, a deadbolt assembly may include an adjustment mechanism, for example as described below with reference to FIG. 17.

Figure 5:
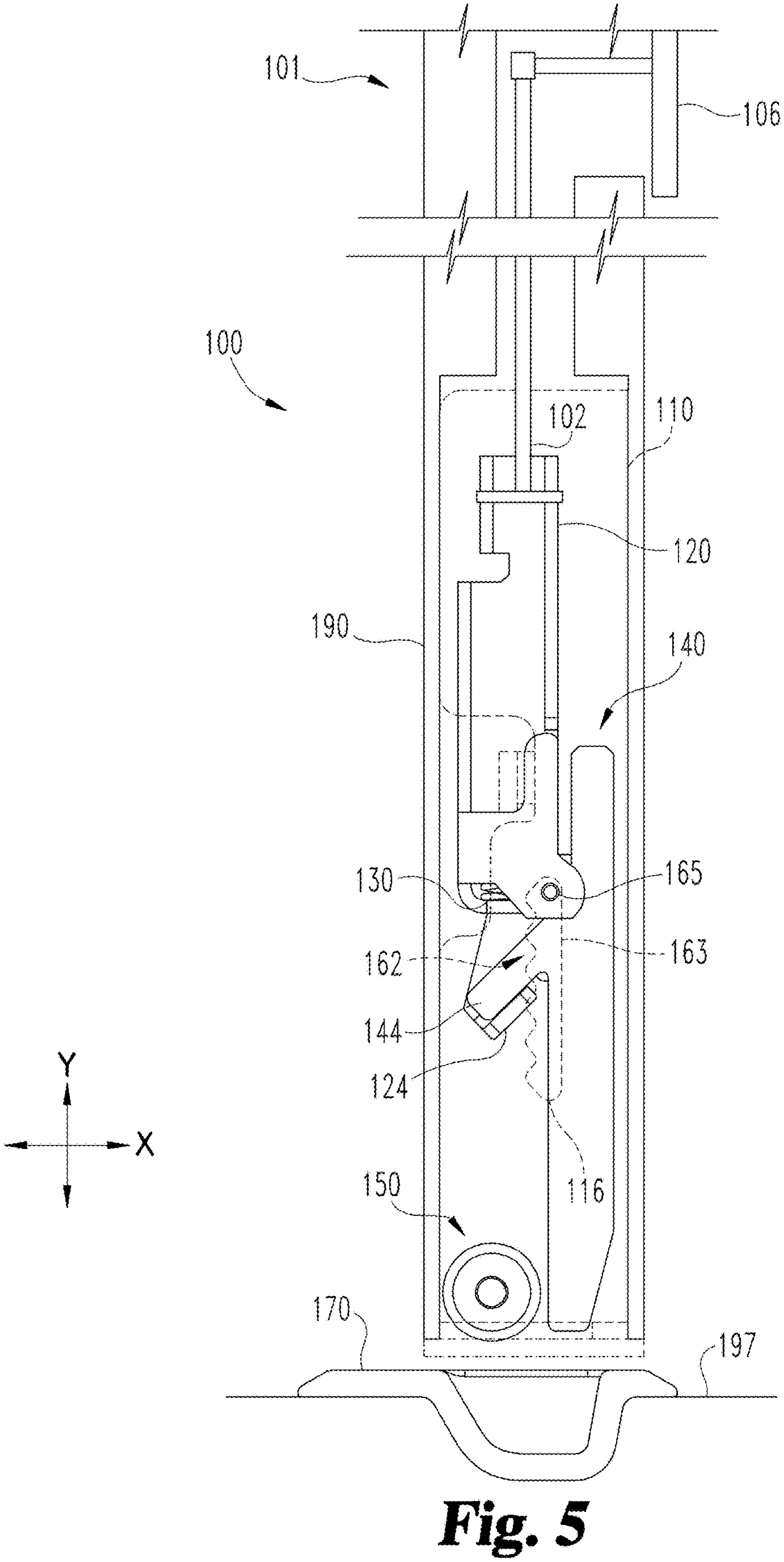
FIG. 5 depicts the system with the deadbolt assembly in a retracted state.

With the traveler 120 coupled to the connector 102, the longitudinal position of the traveler 120 varies in response to the position and effective length of the connector 102. For example, the traveler 120 may comprise: a first longitudinal position in response to the connector 102 being in the extended position while having a first effective length EL1; a second longitudinal position in response to the connector 102 being in the extended position while having a second effective length EL2; and a third longitudinal position in response to the connector 102 being in the retracted position while having the second effective length EL2. The first longitudinal position may be a first extended position such as a fully extended position (FIG. 3). The second longitudinal position may be a second extended position such as an adjusted extended position (FIG. 4). The third longitudinal position may be a retracted position (FIG. 5). Due to the engagement between the traveler 120 and the bolt 140, the state of the deadbolt assembly 100 depends at least in part upon the longitudinal position of the traveler 120.

FIG. 3 depicts the deadbolt assembly 100 in a first extended state in response to the first longitudinal position of the traveler 120. The illustrated first extended state is a fully extended state wherein the distal end portion 145 extends from the housing 110 by a maximum projection distance $d_{max}$. In the fully extended state, the deadlocking protrusion

165 may be positioned at a distal end of the slot 116, and may be supported by the distal edge of the slot 116. With the deadbolt assembly 100 in the fully extended state, the longitudinal positions of the traveler 120 and the bolt 140 may be considered fully extended positions thereof.

With the bolt 140 in the fully extended position, the bolt distal end portion 145 may extend from the housing 110 by a greater distance than is useful for locking operations (for example if the maximum projection distance $d_{max}$ is greater than the depth of the strike pocket 172). In order to adjust the projection distance, a user may adjust the longitudinal position of the traveler 120 by operating the adjustment mechanism 108 such that the connector 102 comprises the second effective length EL2, as illustrated in FIG. 4.

FIG. 4 depicts the deadbolt assembly 100 in a second extended state in response to the second longitudinal position of the traveler 120. The illustrated second extended state is an adjusted extended state wherein the distal end portion 145 extends from the housing 110 by an adjusted projection distance $d_{adj}$, which may correspond to the depth of the strike pocket 172. In the adjusted extended state, the spring 130 may be compressed between the arm 113 and the flange 128, thereby biasing the traveler 120 in the distal direction. With the deadbolt assembly 100 in the adjusted extended state, the longitudinal positions of the traveler 120 and the bolt 140 may be considered adjusted extended positions thereof.

When the deadbolt assembly 100 is in the adjusted extended state, the door 190 may be locked, for example due to engagement of the distal end portion 145 and the strike 170 preventing the door 190 from opening. If a person attempts to open the door 190 without retracting the bolt 140, the lateral support mechanism 150 may engage the body portion 142 to prevent the bolt 140 from moving laterally or pivoting. In order to retract the bolt 140, a user may actuate the actuator 106 to pull the connector 102 to the retracted position illustrated in FIG. 5. As the connector 102 retracts, the traveler 120 is pulled in the proximal direction, which in turn causes the bolt 140 to retract as the traveler wall 124 pulls the ramp arm 144 in the proximal direction.

FIG. 5 depicts deadbolt assembly 100 in a retracted state in response to the third longitudinal position of the traveler 120. In the retracted state, the body portion 142 is retracted into the housing 110. With the bolt 140 in the retracted position, the distal end portion 145 is no longer received in the strike pocket 172, and the deadbolt assembly 100 is free to move laterally with respect to the strike 170. As such, the door 190 is unlocked and free to be opened. With the deadbolt assembly 100 in the retracted state, the longitudinal positions of the traveler 120 and the bolt 140 may be considered retracted positions thereof.

When the actuator 106 is de-actuated, the connector 102 returns to the extended position. In certain embodiments, the actuator 106 may actively move the connector 102 to the extended position. In other embodiments, the actuator 106 may simply remove the force holding the connector 102 in the retracted position, for example if the connector is biased toward the extended state (e.g., by the weight of the connector 102 and/or by the spring 130). As the connector 102 returns the extended position, the traveler 120 and bolt 140 move to their adjusted extended positions (FIG. 4).

With specific reference to FIGS. 4, 6, and 7, operation of the deadlocking mechanism 160 will now be described. With the deadbolt assembly 100 in the adjusted extended state (FIG. 4), the traveler 120 is in the second longitudinal position (or the adjusted extended position), and the deadlocking protrusion 165 is positioned adjacent one of the notches 166. In the illustrated adjusted extended state, the deadlocking protrusion 165 is positioned adjacent the third most distal notch 166. It is to be appreciated that the notch 166 to which the deadlocking protrusion 165 is adjacent will depend upon a number of factors, such as the adjusted projection distance $d_{adj}$, the effective length of the connector 102, the number and positioning of the notches 166, and the dimensions of the various elements of the deadbolt assembly 100. For example, in embodiments in which the strike pocket 172 is shallower, the adjusted projection distance $d_{adj}$ may be smaller, and the deadlocking protrusion 165 may be positioned adjacent the fourth or fifth notch 166 when the deadbolt assembly 100 is in the adjusted extended state.

A common form of attempting to defeat a deadbolt assembly is to apply a pushing force to the extended end of the bolt, thereby urging the bolt in the retracting direction. For example, a person may insert a rigid tool (not illustrated) below the bolt 140 and apply a proximal first force F1 on the bolt 140 in an attempt to force the distal end portion 145 into the housing 110. As will be appreciated, if the first force F1 comprises a lateral force vector urging the bolt 140 laterally toward the traveler 120, the lateral support mechanism 150 engages the bolt 140, providing lateral support thereto.

In response to the first force F1, the bolt 140 may initially move in the proximal or retracting direction. As the bolt 140 moves in the proximal direction, the ramp arm 144 urges the traveler 120 laterally away from the bolt 140. As best illustrated in FIG. 7, the ramp arm 144 translates the first force F1 on the bolt 140 to a second force F2 on the traveler 120, for example via the pin 164 or another portion of the traveler 120. In embodiments which include the spring 130, the spring 130 may resist longitudinal motion of the traveler 120, such that motion of the traveler 120 is substantially confined to the lateral direction.

Figure 6:
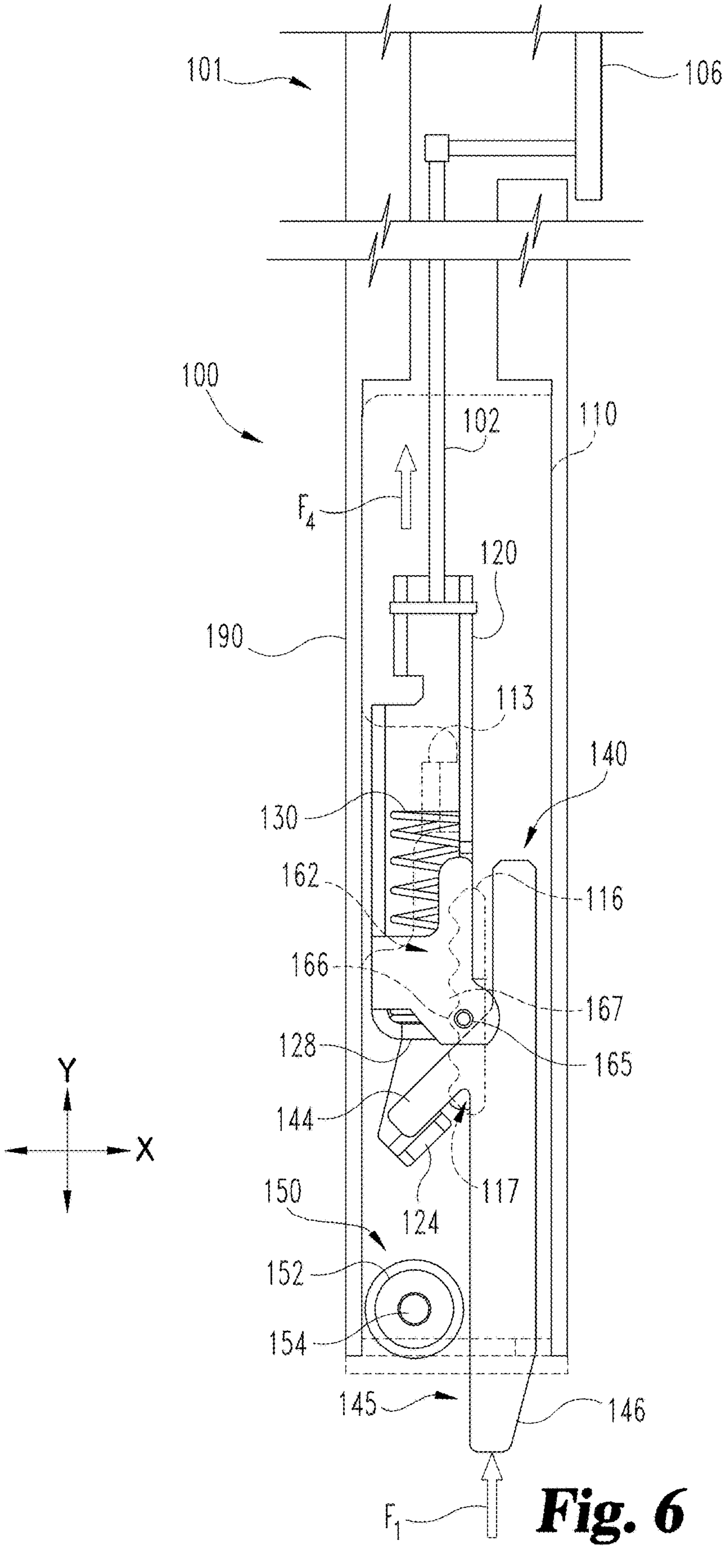
FIG. 6 depicts the system with the deadbolt assembly in a deadlocked state.
Figure 7:
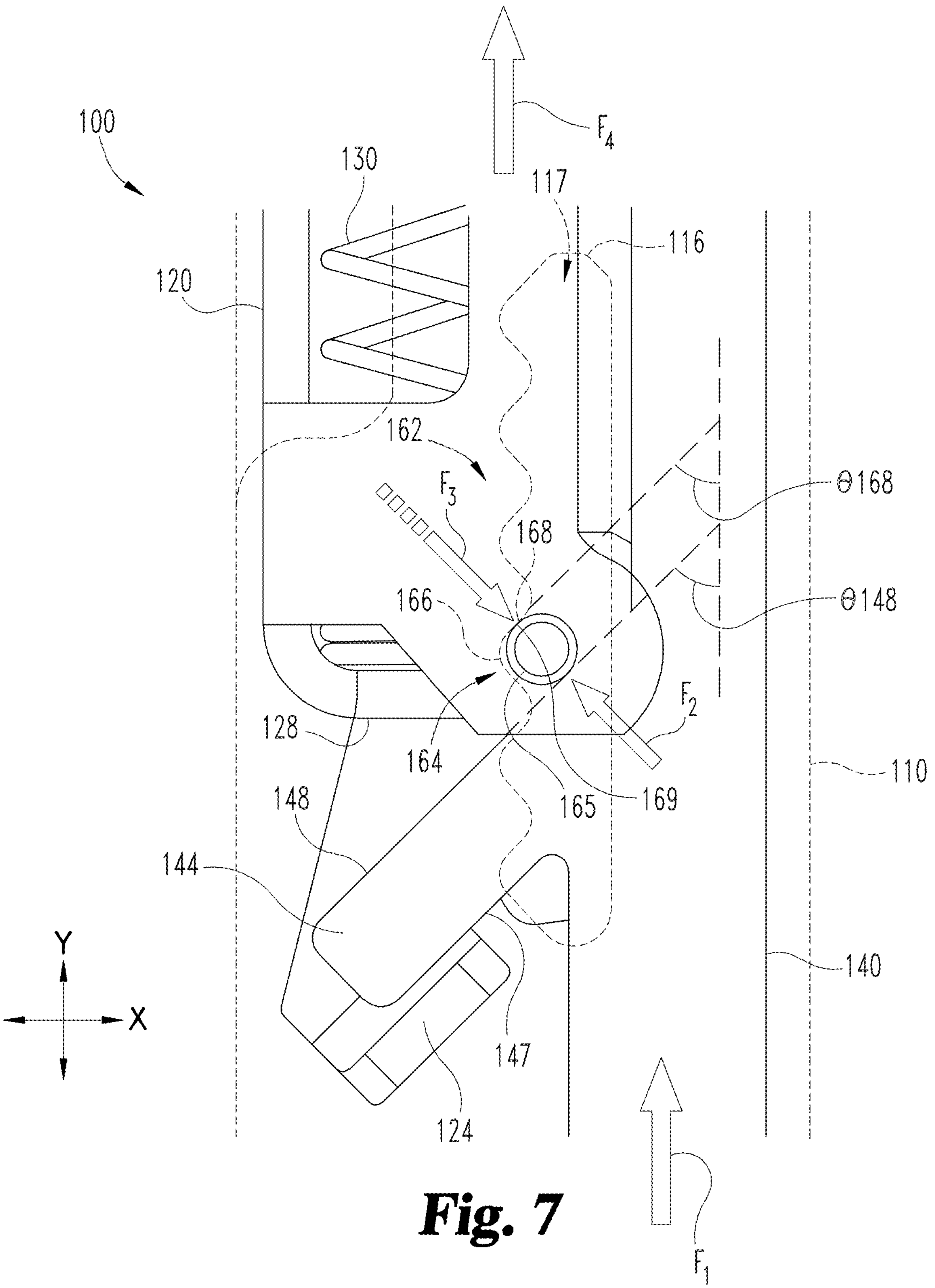
FIG. 7 illustrates a portion of the deadbolt assembly when in the deadlocked state.

The second force F2 urges the traveler 120 from a first lateral position (FIG. 4) to a second lateral position (FIGS. 6 and 7). In the second lateral position, the deadlocking protrusion 165 is received in a notch 166 such that the first contact surface 168 is aligned with the second contact surface 169, and the first and second deadlocking surfaces 168, 169 may be adjacent to one another. As the second force F2 continues to urge the traveler 120 laterally away from the bolt 140, first and second contact surfaces 168, 169 are urged into engagement with one another. Thus, the first contact surface 168 on the proximal side of the notch 166 engages the second contact surface 169 on the proximal side of the deadlocking protrusion 165, and imparts a third force F3 on the second contact surface 169 in response to the second force F2. The force F3 imparted by the first contact surface 168 prevents the deadlocking protrusion 165, and thus the traveler 120, from further movement in the proximal direction. The pin 164 in turn prevents the ramp arm 144 from moving in the proximal direction, such that the traveler 120 prevents further retraction of the bolt 140.

When the first force F1 is removed, the traveler 120 may return to the extended adjusted position, for example in response to the biasing force of the spring 130. As the traveler 120 moves in the distal direction, the third contact surface 168' may urge the deadlocking protrusion 165 (and thus the traveler 120) laterally toward the bolt 140. In embodiments in which the bolt 140 is biased in the distal direction (for example by a spring or by gravity), the bolt 140 may move distally when the first force F1 is removed, such that the ramp arm 144 engages the wall 124, thereby pulling the traveler 120 in the distal direction. In embodiments in which the distal ramp surface 147 is angled or curved, the engagement between the ramp arm 144 and the wall 124 may also pull the traveler 120 laterally toward the bolt. In other embodiments, the distal surface of the ramp arm 144 may not necessarily be angled in such a manner, and the traveler 120 may be urged to the first lateral position only by engagement between the deadlocking protrusion 165 and the projection 167. In further embodiments, third contact surfaces 168' may not necessarily be angled as illustrated in the figures, and the traveler 120 may be urged to the first lateral position by engagement between the wall 124 and the distal ramp surface 147.

As best seen in FIG. 7, the illustrative first contact surfaces 168 are angularly offset from the longitudinal axis Y at an oblique angle θ168. As will be appreciated by those having skill in the art, the force F2 imparted on the pin 164 by the ramp arm 144 is perpendicular to the proximal ramp surface 148, and the force F3 imparted on the deadlocking protrusion 165 by the deadlocking surface 162 is perpendicular to the first contact surface 168. The first contact surface offset angle θ168 may be substantially equal to the proximal ramp surface offset angle θ148, such that the first contact surfaces 168 are substantially parallel to the proximal ramp surface 148. In such embodiments, the force F2 imparted by the ramp arm 144 is entirely or substantially entirely opposed by the reaction force F3 imparted by the first contact surface 168, thereby preventing the deadlocking protrusion 165 from moving toward the longitudinal slot portion 117. The term “substantially” as used herein may be applied to modify a quantitative representation which could permissibly vary without resulting in a change in the basic function to which it is related. For example, the substantially parallel surfaces 148, 168 described hereinabove may permissibly be slightly askew to one another if the deadlocking capability of the deadlocking mechanism 160 is not materially altered.

While in the illustrated embodiment, the first contact surfaces 168 are parallel or substantially parallel to the ramp arm 144 and the proximal ramp surface 148, it is also contemplated that the first contact surfaces 168 may be angularly offset with respect to the proximal ramp surface 148. For example, the first contact surface offset angle θ168 may be slightly greater than the proximal ramp surface offset angle θ148, such that the third force F3 urges the deadlocking protrusion 165 laterally away from the body portion 142. In other embodiments, the first contact surface offset angle θ168 may be slightly less than the proximal ramp surface offset angle θ148, and frictional forces may supplement the third force F3 to prevent the deadlocking protrusions 165 from moving laterally toward the body portion 142.

If the user attempts to retract the bolt 140 while the assembly 100 is in the deadlocked state (for example, when the external force F1 is still being applied), the connector 102 imparts a proximal fourth force F4 on the traveler 120, urging the traveler 120 in the proximal direction. As a result of the proximal or retracting fourth force F4, the reactive third force F3 created by the first contact surface 168 increases (as indicated by the shaded portion thereof), urging the deadlocking protrusion 165 toward longitudinal slot portion 117. As the traveler 120 continues to retract, the wall 124 engages the distal ramp surface 147, which may urge the traveler 120 laterally toward the bolt 140. As a result, the deadlocking protrusion 165 is positioned in the longitudinal slot portion 117, and the traveler 120 is free to continue retracting the bolt 140.

In the illustrated form, the wall 124, the first contact surfaces 168, and the ramp arm 144—including the distal and proximal ramp surfaces 147, 148 thereof—are offset from the longitudinal axis Y by the same or substantially the same oblique angle. In various forms, the oblique offset angle may be about 45°, between about 40° and about 50°, or between about 30° and about 60°. For example, the first contact surface offset angle θ168 may be changed by adjusting one or both of the central angles θ166, θ167, or by retaining the perpendicularity of the first and third contact surfaces 168, 168' while adjusting the offset angle of the third contact surface 168'. In other embodiments, one or more of the wall 124, ramp arm 144, distal ramp surface 147, and proximal ramp surface 148 may be offset from the longitudinal axis Y by another angle. Furthermore, while each of the wall 124, the first contact surfaces 168 and the ramp arm 144 including the distal and proximal ramps 147, 148 is substantially rectilinear in the illustrated embodiment, it is also contemplated that one or more of the wall 124, first contact surfaces 168, ramp arm 144, distal ramp surface 147, and proximal ramp surface 148 may be partially or entirely curvilinear. For example, the distal ramp surface 147 may be arcuate, and the wall 124 may comprise an arcuate shape corresponding to that of the distal ramp surface 147.

While a single deadlocking state of the deadlocking mechanism 160 has been described hereinabove, it is to be appreciated that the illustrated deadlocking mechanism 160 has a plurality of such states. For example, when the deadbolt assembly 100 is in the fully extended state (FIG. 3), a deadlocking state may include the deadlocking protrusion 165 being received in the distal-most notch 166. When the deadbolt assembly 100 is in a second adjusted extended state (not illustrated), a deadlocking state may include the deadlocking protrusion 165 being received in another of the notches 166.

In the illustrated deadlocking mechanism 160, the deadlocking member in the form of the pin 164 includes a first deadlocking element in the form of the deadlocking protrusion 165 and the deadlocking surface 162 includes a plurality of second deadlocking elements in the form of the notches 166. As a result, the deadlocking mechanism 160 has a plurality of deadlocking states. In other embodiments, the deadlocking mechanism 160 may have a single deadlocking state. For example, each of the deadlocking surfaces 162 may comprise a single notch 166. In other embodiments, each of the deadlocking member and the deadlocking surface may comprise a single deadlocking element. In further embodiments, a deadlocking member may include a plurality of first deadlocking elements such as protrusions or notches, for example as depicted in FIGS. 8-10.

Figure 8:
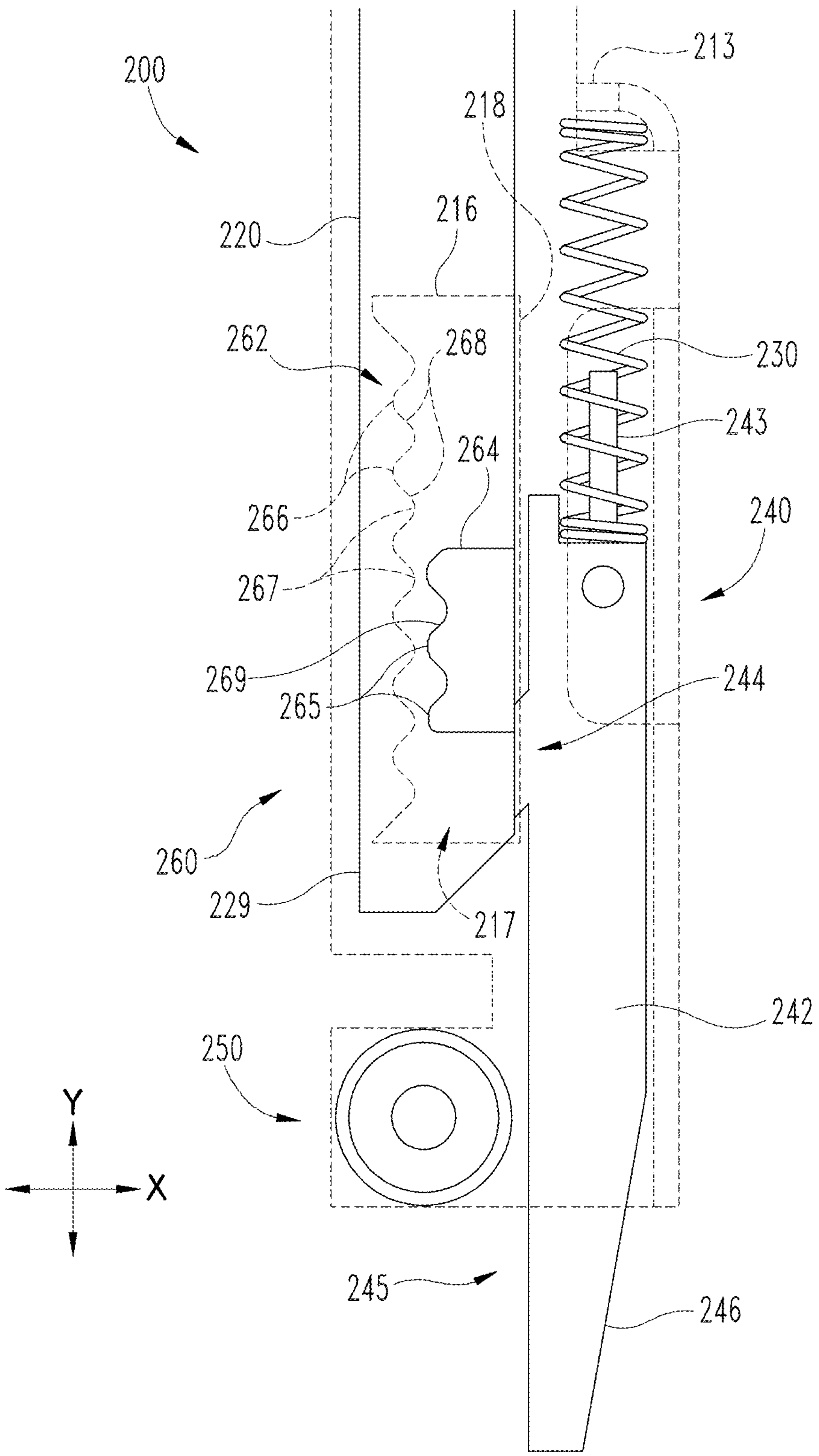
FIG. 8 depicts a deadbolt assembly according to a second embodiment in an extended state.
Figure 9:
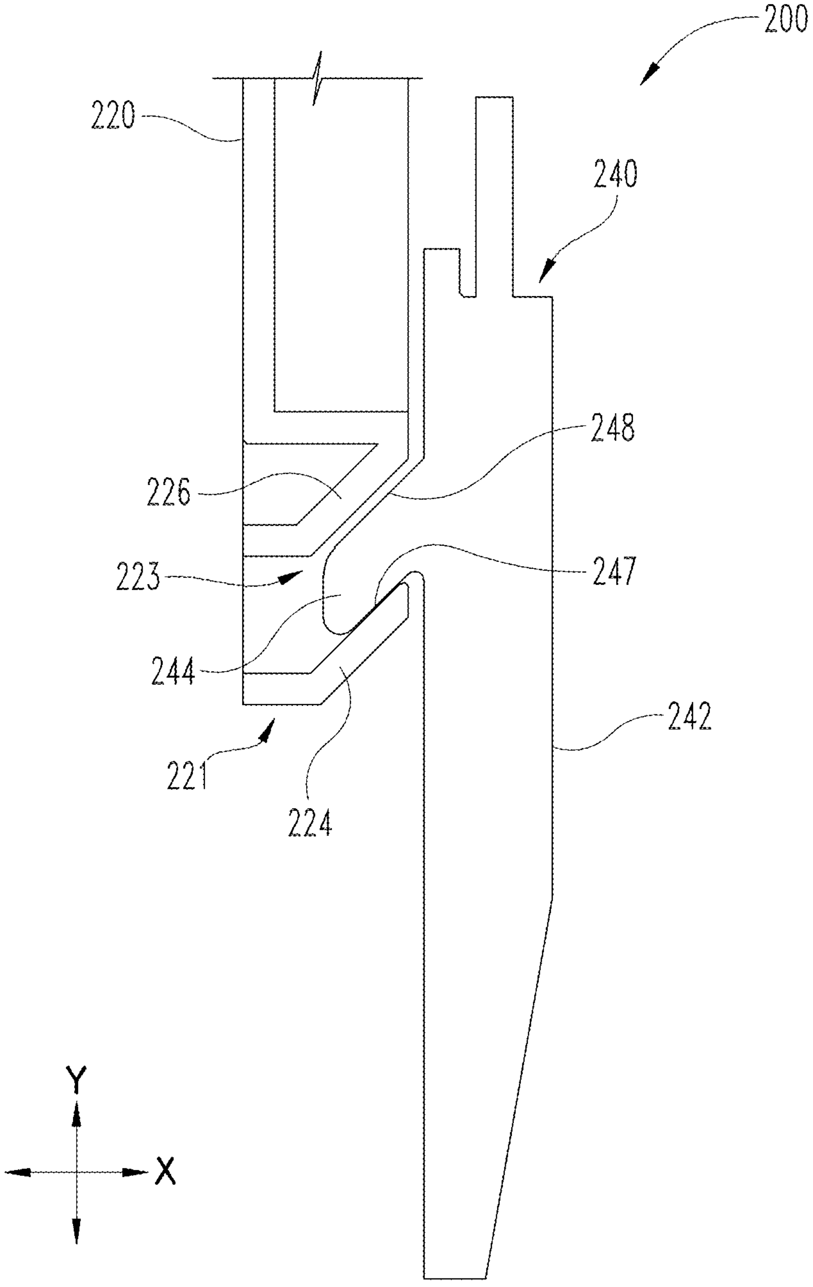
FIG. 9 is a cross-sectional illustration of the deadbolt assembly of FIG. 8 in the extended state.
Figure 10:
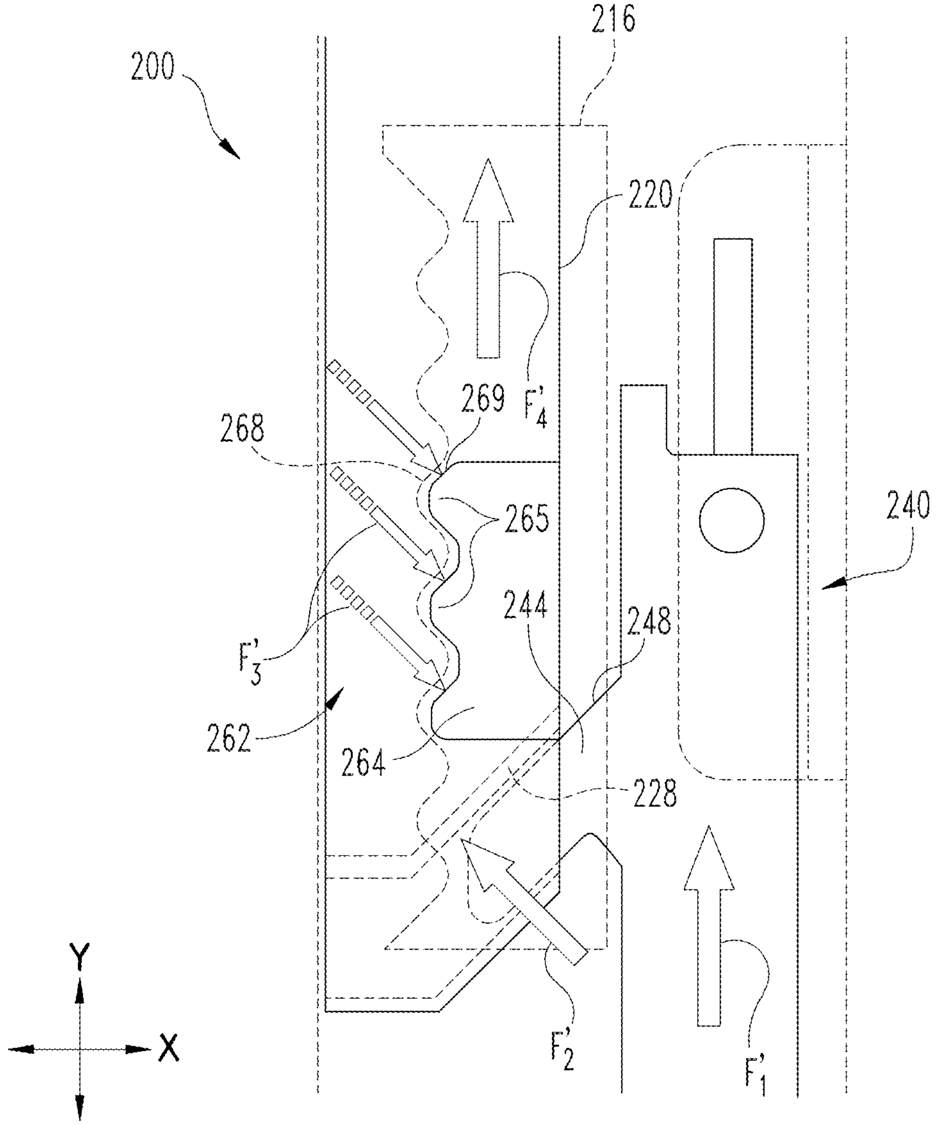
FIG. 10 depicts the deadbolt assembly of FIG. 8 in a deadlocked state.

With reference to FIGS. 8-10, a deadbolt assembly 200 according to a second embodiment is illustrated. The deadbolt assembly 200 is substantially similar to the deadbolt assembly 100 described above with reference to FIGS. 1-8. Unless indicated otherwise, similar reference characters are used to indicate similar elements and features. In the interest of conciseness, the following description focuses primarily on features which are different than those described with respect to the deadbolt assembly 100.

The deadbolt assembly 200 generally includes a housing 210, a traveler 220 received in the housing 210, a bolt 240 engaged with the traveler 220, a lateral support mechanism 250 providing lateral support to the bolt 240, and a deadlocking mechanism 260 operable to prevent the bolt 240 from being moved to a retracted position by an external force. The assembly 200 may further include a spring (not illustrated) urging the traveler 220 in an extending direction.

The deadbolt assembly 200 may further include a bolt spring 230 urging the bolt 240 in the extending direction. For example, a proximal end of the bolt spring 230 may be in contact with a flange 213 formed by the housing 210, and a distal end of the bolt spring 230 may be seated on a post 243 extending from a proximal end of the bolt 240. The deadbolt assembly 200 may include the bolt spring 230, for example, if the extending direction is upward or comprises an upward component against the force of gravity (such as when the deadbolt assembly 200 is utilized as a top bolt installed near the top edge of a door), or if the longitudinal axis Y is horizontal or comprises a horizontal component (such as when the deadbolt assembly 200 is utilized as a side bolt installed near the swinging edge of a door). It is also contemplated that the spring 230 may be utilized in embodiments in which the extending direction is downward or comprises a downward component (such as when the deadbolt assembly 200 is utilized as a bottom bolt installed near the bottom edge of a door).

The example housing 210 includes a slot 216 comprising a longitudinally extending portion 217, which extends substantially in the direction of the illustrated Y-axis and includes a deadlocking surface 262 opposite a straight edge 218. The deadlocking mechanism 260 includes the deadlocking surface 262 and a deadlocking member 264 operable to engage the deadlocking surface 262 in a plurality of locations, such that the deadlocking mechanism 260 has a plurality of deadlocking states. The deadlocking member 264 extends transversely from a side of the traveler 220 into the slot 216. Lateral motion of the traveler 220 is thus constrained by the deadlocking surface 262 and the straight edge 218, which define laterally spaced edges of the slot 216 into which the deadlocking member 264 extends.

While the elevational view of FIG. 8 depicts only one of each of the slot 216, deadlocking surface 262, and deadlocking member 264, it is to be appreciated that the opposite side of the deadbolt assembly 200 may include corresponding features transversely spaced from those visible in FIG. 8. Additionally, while the deadlocking surface 262 is depicted herein as defining an edge of the slot 216, it is also contemplated that that the deadlocking surface 262 may be formed elsewhere. For example, a wall may be attached to the left side of the housing 210 (as depicted in FIG. 8). In such embodiments, the wall may define the deadlocking surface 262, and the deadlocking member 264 may be formed on or attached to the left side 229 of the traveler 220 (as depicted in FIG. 8).

In the illustrated form, the deadlocking surface 262 comprises a series of alternating notches 266 and projections 267, with first contact surfaces 268 defining connecting edges of the notches 266 and projections 267. The deadlocking surface 262 may, for example, be substantially similar to the above-described deadlocking surface 162. The deadlocking member 264 is configured to matingly engage the deadlocking surface 262 in a plurality of positions, and includes one or more deadlocking protrusions 265. The deadlocking protrusions 265 may be sized and configured to be received in the notches 266, and include second contact surfaces 269 engageable with the first contact surfaces 268. The deadlocking member 264 may include a plurality of the deadlocking protrusions 265 separated by notches, and may, for example, have a shape corresponding to that of the of the deadlocking surface 262, such that the deadlocking member 264 flushly engages deadlocking surface 262 when the traveler 220 is in the second lateral position. While the illustrated deadlocking member 264 includes three deadlocking protrusions 265, it is also contemplated that more or fewer deadlocking protrusions 265 may be utilized.

FIG. 8 depicts the deadbolt assembly 200 in an adjusted extend state, similar to that depicted in FIG. 4. In the adjusted extended state, the traveler 220 is in the adjusted extended position, and the bolt distal end portion 245 protrudes from the housing 210, and may engage a strike to prevent a door from being opened.

FIG. 9 depicts a cross-sectional view of the traveler 220 and the bolt 240, illustrating the engagement therebetween. As with the above-described traveler 120 and bolt 140, engagement between the traveler 220 and bolt 240 of the instant embodiment is such that the traveler 220 moves laterally in response to the bolt 240 being driven in the proximal direction, and the bolt 240 retracts in response to retraction of the traveler 220.

Generally speaking, the bolt 240 includes a ramp arm 244 which is angularly offset with respect to the bolt body portion 242. The ramp arm 244 may, for example, be substantially similar to the above-described ramp arm 144. The traveler 220 includes sleeve 221 defining a gap 223 which receives the ramp arm 244 such that the ramp arm 244 is engaged with the traveler 220. More specifically, the gap 223 is defined in part by transversely-extending elements in the form of a distal wall 224 and a proximal wall 226 spaced from the distal wall 224. When the ramp arm 144 is engaged with the traveler 220, the distal wall 224 is adjacent and substantially parallel to the distal ramp surface 247, and the proximal wall 226 is adjacent and substantially parallel to the proximal ramp surface 248.

When the traveler 220 is retracted (e.g., via a connector to which it is coupled), the distal wall 224 engages the distal ramp surface 247, pulling the bolt 240 in the retracting direction. When the bolt 240 is driven longitudinally inward (that is to say, in the proximal or retracting direction) by an external force, the proximal ramp surface 248 engages the proximal wall 226, urging the traveler 220 laterally away from the bolt 240. The width of the gap 223 may be substantially equal to the thickness of the ramp arm 244 (allowing for tolerances), such that there is substantially no lost motion between the traveler 220 and the bolt 240 in the longitudinal direction Y.

With specific reference to FIG. 10, when an external pushing first force F1' is applied to drive the bolt 240 longitudinally inward, the ramp arm 244 translates the first force F1' on the bolt 240 to a second force F2' on the traveler 220, urging the traveler 220 laterally away from the bolt 240 in a manner similar to that described above. In other words, the ramp arm 244 urges the traveler 220 from a first lateral position to a second lateral position in response to the first force F1'. As the traveler 220 moves laterally away from the bolt 240 and into the second lateral position, the deadlocking member 264 engages the deadlocking surface 262, such that each of the deadlocking protrusions 265 is received in one of the notches 266. With the deadlocking protrusions 265 received in the notches 266, the first contact surface 268 on the proximal side of each deadlocking protrusion 265 imparts a third force F3' on the second contact surface 269 on the proximal side of each deadlocking protrusion 265 in response the second force F2'. The forces F3' imparted by the first contact surfaces 268 prevent the deadlocking protrusions 265, and thus the traveler 220, from further movement in the proximal direction. The proximal wall 226 in turn prevents the ramp arm 244 from traveling in the proximal direction, such that the traveler 220 prevents further retraction of the bolt 240. When the first force F1' is removed, the traveler 220 may return to the adjusted extended position and the first lateral position, for example as described above with reference to the traveler 120.

If the user attempts to retract the bolt 240 while the assembly 200 is in the deadlocked state (for example, when the external force F1' is still being applied), the connector (not illustrated) imparts a pulling fourth force F4' on the traveler 220, urging the traveler 220 in the proximal direction. As a result of the longitudinal retracting force F4', the reactive forces F3' created by the first contact surfaces 268 increase (as indicated by the shaded portions thereof), urging the deadlocking protrusions 265 toward the longitudinally-extending portion of the slot 216. As the traveler 220 continues to retract, the distal wall 224 engages the distal ramp surface 247, which may urge the traveler 220 laterally toward the bolt 240. As a result, the deadlocking protrusions 265 are positioned in the longitudinally-extending portion of the slot 216, and the traveler 220 is free to continue retracting the bolt 240.

Figure 11:
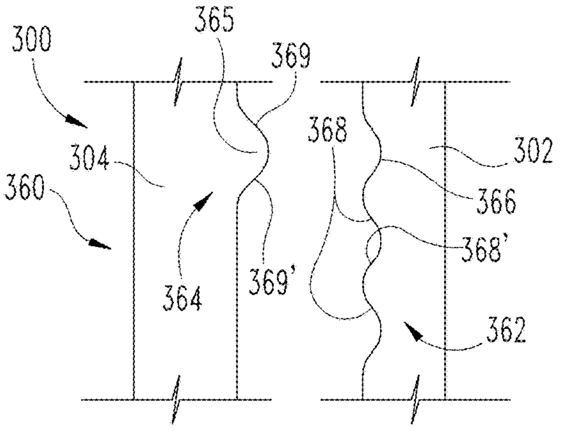
FIGS. 11-16 illustrate deadlocking mechanisms according to further embodiments.

FIG. 11 depicts a portion of a deadbolt assembly 300 including a first assembly component 302, a second assembly component 304, and a deadlocking mechanism 360 comprising a deadlocking surface 362 and a deadlocking member 364. The first assembly component 302 includes the deadlocking surface 362 and the second assembly component 304 includes the deadlocking member 364. The deadbolt assembly 300 may be configured in a similar fashion as one of the above-described deadbolt assemblies 100, 200, and the deadlocking mechanism 360 may be utilized in place of or in combination with the corresponding deadlocking mechanism 160, 260. For example, the deadbolt assembly 300 may be the deadbolt assembly 100, and the deadlocking mechanism 360 may be utilized in place of the deadlocking mechanism 160. In such embodiments, the first assembly component 302 may be one of the housing 110 and the traveler 120, and the second assembly component 304 may be the other of the housing 110 and the traveler 120.

The deadlocking member 364 includes a deadlocking protrusion 365, and the deadlocking surface 362 includes a plurality of notches 366 sized and configured to receive the deadlocking protrusion 365. The deadlocking surface 362 further includes proximal first contact surfaces 368 and distal first contact surfaces 368' on opposing sides of each notch 366. The deadlocking member 364 likewise includes a proximal second contact surface 369 and a distal second contact surface 369' on opposing sides of the deadlocking protrusion 365. Depending upon which of the assembly components 302, 304 is the housing and which is the traveler, either the proximal contact surfaces 368, 369 or the distal contact surfaces 368', 369' may perform the functions of the above-described contact surfaces 168, 169.

In embodiments in which the first assembly component 302 is the housing and the second assembly component 304 is the traveler, one of the proximal first contact surfaces 368 engages the proximal second contact surface 369 when the traveler 120 (second assembly component 304) is in the second lateral position and is urged in the proximal direction. On the other hand, in embodiments in which the first assembly component 302 is the traveler and the second assembly component 304 is the housing, one of the distal first contact surfaces 368' the distal second contact surface 369' when the traveler (first assembly component 302) is in the second lateral position and is urged in the proximal direction.

Figure 12:
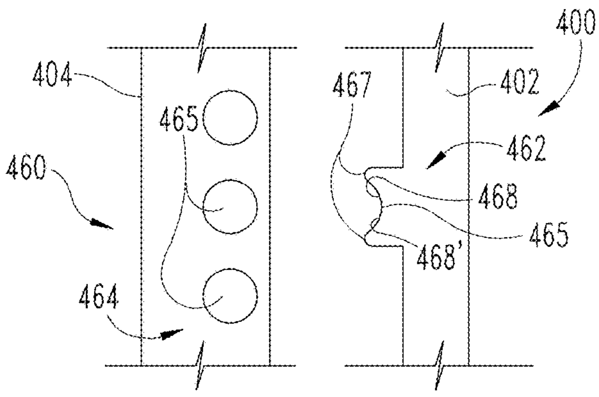
Figure 13:
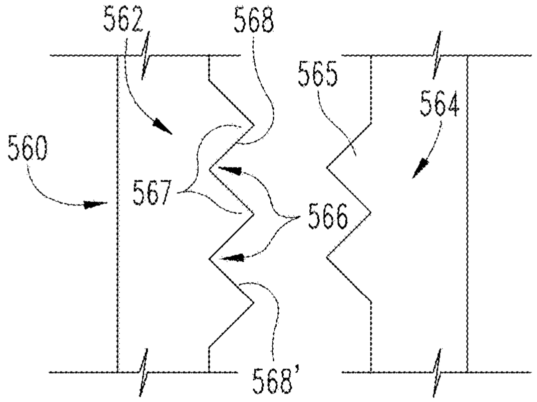
Figure 14:
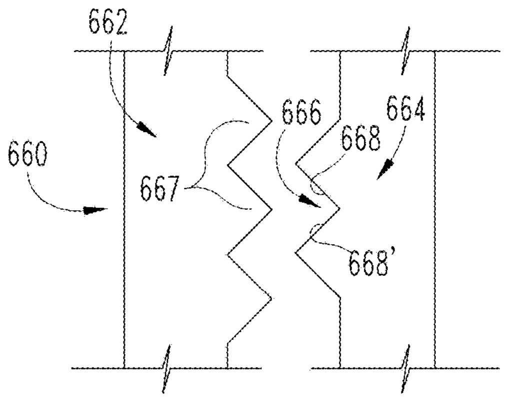

FIGS. 12-14 illustrate further embodiments of deadbolt assemblies and deadlocking mechanisms similar to the deadbolt assembly 300 and deadlocking mechanism 360 described above with reference to FIG. 11. Similar reference characters are used to indicate similar elements and features. In the interest of conciseness, the following descriptions focus primarily on features which are different than those described above with reference to FIG. 11.

In FIG. 12, the deadlocking member 464 comprises a plurality of the deadlocking protrusions 465, and the deadlocking surface 462 includes a single notch 466 sized and configured to receive each individual deadlocking protrusion 465. The deadlocking protrusions 465 may, for example, be defined by pins such as the above-described pin 164. In this and other embodiments, it is also contemplated that the deadlocking member 464 may be considered a deadlocking surface having notches defined as the space between the deadlocking protrusions 465, in which case the deadlocking surface 462 may be considered a deadlocking member including deadlocking protrusions in the form of the projections 467.

As noted above, in certain embodiments, a component of the deadlocking mechanism may be considered to be either the deadlocking surface or the deadlocking member. FIGS. 13 and 14 depict substantially identical deadlocking mechanisms 560, 660. In each of FIGS. 13 and 14, the deadlocking member includes a first deadlocking element, and the deadlocking surface includes a plurality of second deadlocking elements. In FIG. 13, the deadlocking member 564 includes a first deadlocking element in the form of a deadlocking protrusion 565, and the deadlocking surface 562 includes a plurality of second deadlocking elements in the form of notches 566. In FIG. 14, the deadlocking member 664 includes a first deadlocking element in the form of a notch 666, and the deadlocking surface 662 includes a plurality of second deadlocking elements in the form of deadlocking protrusions 665.

Figure 15:
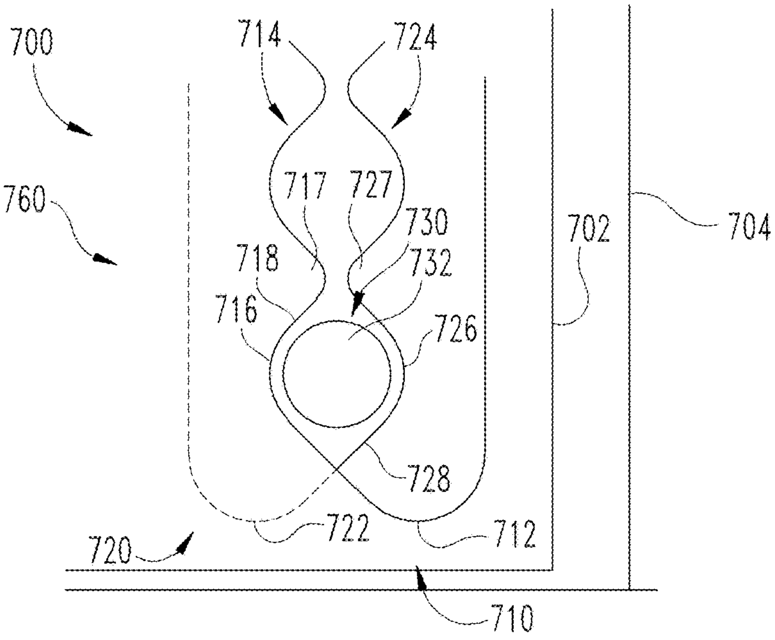

FIG. 15 depicts a deadbolt assembly 700 according to a further embodiment. The deadbolt assembly 700 includes a first assembly component 702 and a second assembly component 704. The deadbolt assembly 700 may be configured in a similar fashion as one of the above-described deadbolt assemblies 100, 200, and the deadlocking mechanism 760 may be utilized in place of or in combination with the corresponding deadlocking mechanism 160, 260. For example, the deadbolt assembly 700 may be the deadbolt assembly 100, and the deadlocking mechanism 760 may be utilized in place of the deadlocking mechanism 160. In the illustrated form, the first assembly component 702 is a housing such as the housing 110, and the second assembly component 704 is a traveler such as the traveler 120. It is also contemplated that the first assembly component 702 may be a traveler such as the traveler 120, and the second assembly component 704 may be a housing such as the housing 110.

The deadlocking mechanism 760 comprises a first deadlocking component 710 and a second deadlocking component 720. The housing 702 includes the first deadlocking component 710, and the traveler 704 includes the second deadlocking component 720. The first deadlocking component 710 includes a first slot 712, an edge of which defines a first deadlocking surface 714. The first deadlocking surface 714 comprises a series of alternating notches 716 and projections 717, with contact surfaces 718 connecting the notches 716 and projections 717. The slot 712 and the features thereof may be substantially similar to those described above with reference to the slot 116. The second deadlocking component 720 is substantially similar to the first deadlocking component 710, and similar reference characters are used to indicate similar elements and features.

The slots 712, 722 are oriented in opposite directions such that the deadlocking surfaces 714, 724 face one another. The slots 712, 722 may, for example, be mirror images of one another. The deadlocking mechanism 760 further includes a floating member 730 as a defining a deadlocking protrusion 732 extending into the slots 712, 722. The floating member 730 may, for example, comprise a pin, roller, bearing, or ball. In various forms, the floating member 730 and the deadlocking protrusion 732 thereof may be considered to be included in the first deadlocking component 710 or the second deadlocking component 720, or may be considered to be a third deadlocking component.

When the traveler 704 is in the second lateral position (FIG. 15), the contact surfaces 718, 728 are aligned with one another, the deadlocking protrusion 732 is received in one of the notches 716, 726 of each of the deadlocking surfaces 714, 724, and is captured between the contact surfaces 718, 728. When the traveler 704 is urged in the proximal direction, the contact surfaces 718, 728 are urged into engagement through the deadlocking protrusion 732. The engagement between the contact surfaces 718, 728 (through the deadlocking protrusion) deadlocks the deadbolt assembly 700 in a manner substantially similar to that described above with reference to FIG. 10.

Figure 16:
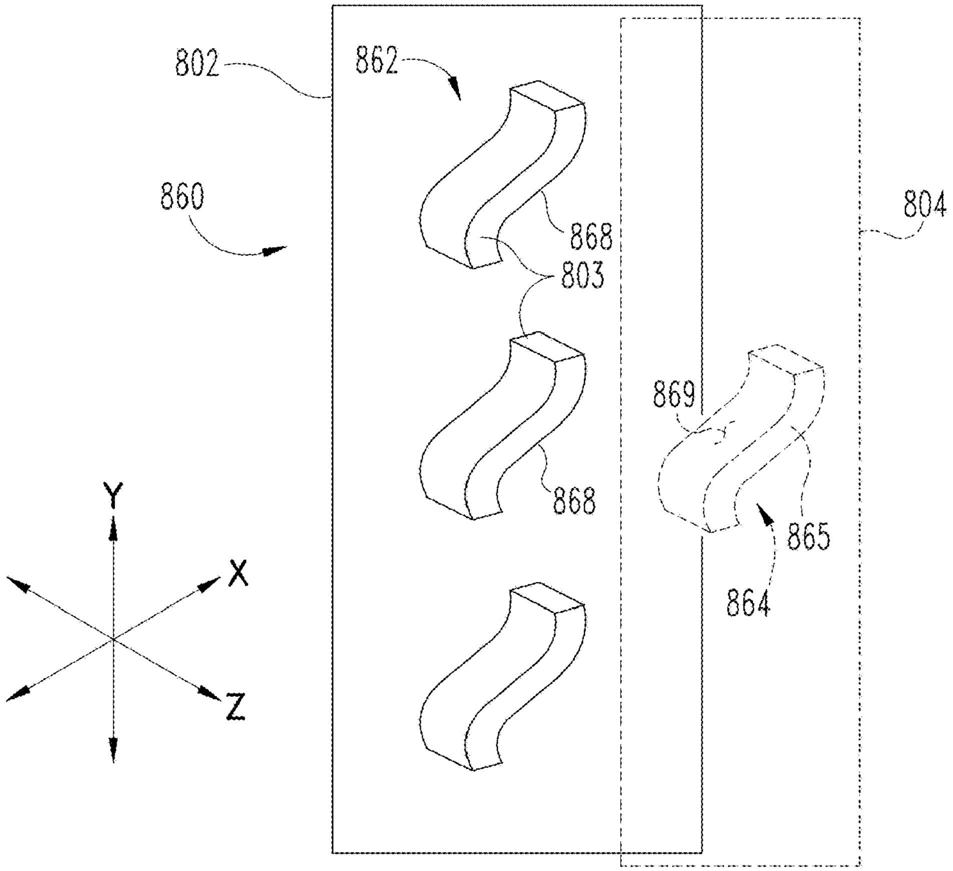

FIG. 16 depicts a deadlocking mechanism 860 according to another embodiment. A first deadbolt assembly component 802 includes the deadlocking surface 862 and a second deadbolt assembly component 804 includes the deadlocking member 864. The first assembly component 802 includes transverse extensions 803, each of which defines a first contact surface 868. The dead deadlocking member 864 includes a deadlocking protrusion 865 defining a second contact surface 869. The first assembly component 802 may, for example, be one of a housing and a traveler, and the second assembly component may be the other of a housing and a traveler. One or both of the deadlocking surface 862 and the deadlocking member 864 may be used in combination with or in place of one of the above-described deadlocking surfaces and deadlocking members.

Figure 17:
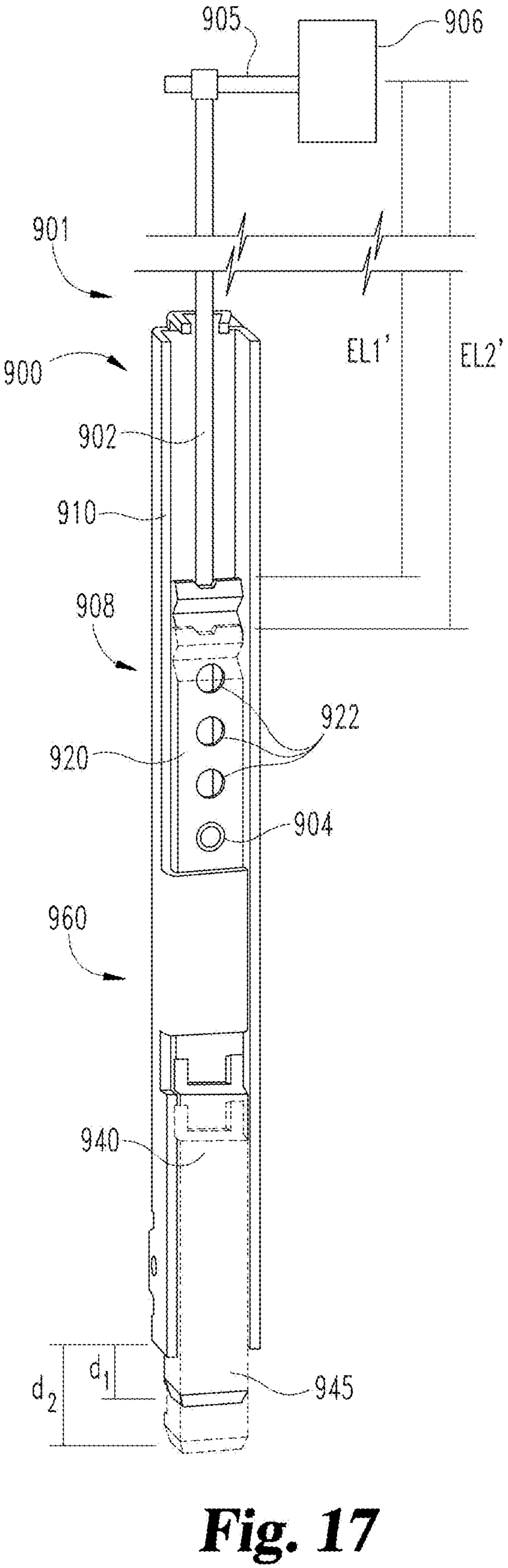
FIG. 17 illustrates a deadbolt assembly according to a third embodiment.

FIG. 17 depicts a deadbolt assembly 900 according to a further embodiment. The deadbolt assembly 900 includes a housing 910, a traveler 920, a bolt 940, and a deadlocking mechanism 960, and may further include a lateral support mechanism (not illustrated), all or some of which may be substantially similar to those described above. The deadbolt assembly 900 may be utilized in conjunction with a remote latching system 901 including a connector 902 coupling the traveler 920 to an actuator 906. The housing 910 may be inserted through a proximal side of a secondary housing similar to one of the above-described housings 110, 210. The housing 910 may be coupled to the secondary housing (e.g., via a pin) and the secondary housing may in turn be coupled to a door in a manner similar to that described above.

In the illustrated form, the traveler 920 includes a plurality of longitudinally spaced coupling features 922, and the system 901 includes an adjustment mechanism 908 comprising the coupling features 922. Each of the coupling features 922 is engageable with a distal end of the connector 902. In the illustrated form, each coupling feature 922 comprises an opening operable to receive a post 904 on the distal end of the connector 902, although other forms of coupling are contemplated, such as those described above with reference to the coupling feature 102. Additionally, while each of the illustrated coupling features 922 comprises a discrete opening, it is also contemplated that the coupling features 922 may be connected. For example, opposing sides of the traveler 920 may comprise longitudinal slots, and the coupling features 922 may be formed by scalloped edges of the slots.

The deadbolt assembly 900 is operable in a plurality of states, and the state of the assembly 900 depends in part upon the effective length of the connector 902. As with the above-described system 101, the effective length of the connector 902 may be defined as the length between the actuator arm 905 and the proximal end of the traveler 920. The adjustment mechanism 908 is operable to adjust the effective length of the connector 902. For example, the connector 902 may comprise a first effective length EL1' when the distal end of the connector 902 is engaged with a first of the coupling features 922, and the connector 902 may comprise a second effective length EL2'.

With the connector 902 in the extended position while having the first effective length EL1', the deadbolt assembly 900 is in a first extended position wherein the bolt distal end portion 945 projects from the housing 910 by a first projection distance $d_1$. With the connector 902 in the extended position while having the second effective length EL2', the deadbolt assembly 900 is in a second extended position wherein the bolt distal end portion 945 projects from the housing 910 by a second projection distance $d_2$.

In certain forms, the deadlocking mechanism 960 may be operable in a number of deadlocking states corresponding to the number of coupling features 922. For example, in embodiments in which the adjustment device 908 comprises four coupling features 922, the deadlocking mechanism 960 may include a deadlocking surface with four notches and four first contact surfaces.

In the illustrated form, each of the coupling features 922 is operable to couple the traveler 920 with the connector 902. In other forms, the coupling features 922 may comprise gaps operable to receive the ramp arm of the bolt 940 in a manner similar to that described above with reference to the gaps 123, 223, and the traveler 920 may be coupled to the connector 902 at a single coupling point. Furthermore, the illustrated traveler 920 comprises a single piece, and each of the coupling features 922 is operable to engage the connector 902. In other forms, the traveler 920 may comprise selectively engageable proximal and distal sections. For example, the proximal section may be coupled to the connector 902, and the distal section may be coupled to the proximal section through one of the coupling features 922. The distal section may include one or more gaps operable to receive the ramp arm of the bolt 940 in a manner similar to that described above. In certain forms, one or both of the proximal and distal sections may include deadlocking components operable to engage a corresponding deadlocking component in the housing 910.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A deadbolt assemby, comprising:

a housing extending along a longitudinal axis defining a proximal direction and an opposite distal direction;

a traveler mounted in the housing for longitudinal movement along the longitudinal axis and for lateral movement transverse to the longitudinal axis;

a bolt engaged with the traveler and mounted in the housing for longitudinal movement along the longitudinal axis, wherein the bolt is configured to laterally move the traveler from a first lateral position to a second lateral position when an external proximal pushing force is applied to a distal end portion of the bolt; and a deadlock mechanism configured to prevent the external proximal pushing force from driving the bolt and the traveler proximally when the traveler is in the second lateral position, and to permit the traveler to move from the second lateral position to the first lateral position when a proximal pulling force is applied to the traveler.

2. The deadbolt assembly of claim 1, wherein the deadlock mechanism is defined in part by the traveler and in part by the housing.

3. The deadbolt assembly of claim 1, wherein the deadlock mechanism comprises a plurality of notches and a protrusion operable to be received in each of the notches.

4. The deadbolt assembly of claim 3, wherein the housing comprises a longitudinal slot defining the plurality of notches;

wherein the traveler comprises the protrusion; and wherein the protrusion projects into the longitudinal slot.

5. The deadbolt assembly of claim 1, wherein the deadlock mechanism has a plurality of deadlocking states;

wherein the traveler is in the second lateral position in each of the deadlocking states; and wherein the traveler is in a different longitudinal position in each of the deadlocking states.

6. The deadbolt assembly of claim 1, further comprising a spring engaged between the housing and the traveler to thereby bias the traveler in the distal direction.

7. A method of operating a deadbolt assembly comprising a housing extending along a longitudinal axis, a traveler mounted in the housing for movement along the longitudinal axis, a bolt movably engaged with the traveler, and a deadlock mechanism, wherein the longitudinal axis defines a proximal direction and an opposite distal direction, the method comprising:

in response to exertion of a proximal pushing force on the bolt, causing the bolt to drive the traveler in a first lateral direction to thereby move the deadlock mechanism to a deadlocking state in which the deadlock mechanism prevents the proximal pushing force from driving the bolt and the traveler in the proximal direction; and in response to exertion of a proximal pulling force on the traveler, driving the traveler in a second lateral direction opposite the first lateral direction to thereby move the deadlock mechanism to a releasing state in which the deadlock mechanism permits the proximal pulling force to pull the traveler and the bolt in the proximal direction.

8. The method of claim 7, further comprising:

adjusting a longitudinal position of the traveler;

after adjusting the longitudinal position of the traveler and in response to exertion of a second proximal pushing force on the bolt, causing the bolt to drive the traveler in the first lateral direction to thereby move the deadlock mechanism to a second deadlocking state in which the deadlock mechanism prevents the second proximal pushing force from driving the bolt and the traveler in the proximal direction; and after moving the deadlock mechanism to the second deadlocking state and in response to exertion of a second proximal pulling force on the traveler, driving the traveler in the second lateral direction to thereby move the deadlock mechanism to the releasing state to thereby permit the second proximal pulling force to pull the traveler and the bolt in the proximal direction.

9. The method of claim 7, wherein causing the bolt to drive the traveler in a first lateral direction comprises causing an oblique arm of the bolt to urge the traveler in the first lateral direction as a result of the proximal pushing force on the bolt.

10. The method of claim 7, wherein movement of the traveler in the first lateral direction causes a deadlocking member of the deadlock mechanism to engage a deadlocking surface of the deadlock mechanism to thereby move the deadlock mechanism to the deadlocking state.

11. The method of claim 10, wherein the deadlocking member comprises a projection; and wherein the deadlocking surface comprises a first notch that receives the projection when the deadlock mechanism is in the deadlocking state.

12. The method of claim 11, wherein the traveler has a first longitudinal position when the deadlock mechanism is in the deadlocking state;

wherein the deadlocking surface comprises a second notch that receives the projection when the deadlock mechanism is in a second deadlocking state; and wherein the traveler has a second longitudinal position different from the first longitudinal position when the deadlock mechanism is in the second deadlocking state.

13. A deadbolt assembly, comprising:

a deadlock mechanism having a releasing state and a plurality of deadlocking states;

a housing that extends along a longitudinal axis defining a proximal direction and an opposite distal direction;

a traveler mounted in the housing for longitudinal movement along the longitudinal axis and for lateral movement transverse to the longitudinal axis between a first lateral position and a second lateral position; and a bolt engaged with the traveler and mounted in the housing for longitudinal movement along the longitudinal axis;

wherein each of the deadlocking states corresponds to a respective longitudinal position of the traveler and one of the deadlocking states corresponds to a current longitudinal position of the traveler;

wherein the traveler in the first lateral position places the deadlock mechanism in the releasing state;

wherein the traveler in the second lateral position places the deadlock mechanism in the one of the deadlocking states corresponding to the current longitudinal position of the traveler; and wherein the bolt is configured to drive the traveler from the first lateral position to the second lateral position in response to exertion of a proximal pushing force on a distal end portion of the bolt to thereby place the deadlock mechanism in the one of the plurality of deadlocking states corresponding to the current longitudinal position of the traveler.

14. The deadbolt assembly of claim 13, wherein the deadlock mechanism is configured to move from each of the deadlocking states to the releasing state in response to exertion of a proximal pulling force on the traveler.

15. The deadbolt assembly of claim 13, wherein the deadlock mechanism comprises a deadlocking surface and a deadlocking member operable to engage the deadlocking surface in each of a plurality of relative longitudinal positions such that each of the relative longitudinal positions corresponds to a respective one of the deadlocking states.

16. The deadbolt assembly of claim 15, wherein the housing comprises the deadlocking surface; and wherein the traveler comprises the deadlocking member.

17. The deadbolt assembly of claim 15, wherein the deadlocking member comprises a protrusion;

wherein the deadlocking surface comprises a plurality of notches operable to receive the protrusion; and wherein the protrusion is received in a different one of the notches in each of the deadlocking states.

18. The deadbolt assembly of claim 13, wherein the bolt is engaged with the traveler via a ramp configured to urge the traveler toward the second lateral position in response to the exertion of the proximal pushing force on the distal end portion of the bolt.

* * * * *